(12) United States Patent
Thiyagarajan et al.

(10) Patent No.: US 11,847,925 B2
(45) Date of Patent: Dec. 19, 2023

(54) SYSTEMS AND METHODS TO DISPLAY AN ELEVATED LANDING PORT FOR AN URBAN AIR MOBILITY VEHICLE

(71) Applicant: Honeywell International Inc., Charlotte, NC (US)

(72) Inventors: Janakiram Thiyagarajan, Karnataka (IN); Kalaiarasu Velappan, Karnataka (IN); Gireesh Kumar R N, Karnataka (IN); Karthic V, Karnataka (IN); Prem Kumar T, Karnataka (IN)

(73) Assignee: Honeywell International Inc., Charlotte, NC (US)

( * ) Notice: Subject to any disclaimer, the term of this patent is extended or adjusted under 35 U.S.C. 154(b) by 259 days.

(21) Appl. No.: 17/338,480

(22) Filed: Jun. 3, 2021

(65) Prior Publication Data
US 2022/0335842 A1    Oct. 20, 2022

(30) Foreign Application Priority Data
Apr. 19, 2021   (IN) .............................. 202111018082

(51) Int. Cl.
*G08G 5/02* (2006.01)
*G06F 3/14* (2006.01)
*B64D 43/00* (2006.01)
*B64D 45/08* (2006.01)
(Continued)

(52) U.S. Cl.
CPC .............. *G08G 5/02* (2013.01); *B64D 43/00* (2013.01); *B64D 45/08* (2013.01); *G06F 3/14* (2013.01); *G06V 20/176* (2022.01); *G09G 5/02* (2013.01); *G09G 2380/12* (2013.01)

(58) Field of Classification Search
None
See application file for complete search history.

(56) References Cited

U.S. PATENT DOCUMENTS 7,586,422 B2 * 9/2009 Goodman ............. B64C 25/426
340/945
8,019,490 B2   9/2011 Ferren et al.
(Continued)

FOREIGN PATENT DOCUMENTS

EP    2077437 A2    7/2009
EP    2708853 B1    3/2014

*Primary Examiner* — Fekadeselassie Girma
(74) *Attorney, Agent, or Firm* — Alston & Bird LLP

(57) ABSTRACT

Disclosed are methods of displaying compatibility between an aircraft and a landing port, the method comprising: determining a current position of the aircraft and a gross weight of the aircraft; determining a landing port based on the current position of the aircraft; receiving a set of parameters associated with the determined landing port; determining an elevation of the determined landing port and a gross weight supported by the determined landing port at least based on the received parameters; determining whether the aircraft is compatible with the landing port at least based on the determined elevation of the determined landing port and by comparing a gross weight of the aircraft with the gross weight supported by the determined landing port; and causing display on a display device of the aircraft of an indication of the determination of whether the aircraft is compatible with the landing port.

20 Claims, 11 Drawing Sheets

(51) Int. Cl.
  *G09G 5/02*   (2006.01)
  *G06V 20/10*   (2022.01)

(56)        References Cited

U.S. PATENT DOCUMENTS

| | | | |
|---|---|---|---|
| 8,560,150 B1* | 10/2013 | Phillips | B64D 45/08 |
| | | | 701/16 |
| 9,527,605 B1 | 12/2016 | Gentry et al. | |
| 9,734,727 B2 | 8/2017 | Songa et al. | |
| 9,752,893 B2 | 9/2017 | Mohideen et al. | |
| 10,109,203 B2* | 10/2018 | Chmelarova | G08G 5/025 |
| 10,112,712 B1* | 10/2018 | Gentry | G05D 1/102 |
| 10,134,289 B2* | 11/2018 | Moravek | G08G 5/025 |
| 10,304,344 B2* | 5/2019 | Moravek | G08G 5/0091 |
| 2004/0030465 A1 | 2/2004 | Conner et al. | |
| 2010/0161156 A1 | 6/2010 | Coulmeau et al. | |
| 2016/0133138 A1* | 5/2016 | Oldach | G05D 1/0676 |
| | | | 701/16 |
| 2017/0088288 A1 | 3/2017 | Wang | |
| 2017/0154537 A1* | 6/2017 | Moravek | B64D 43/00 |
| 2017/0158354 A1* | 6/2017 | Bourne | B64C 39/024 |
| 2018/0245365 A1* | 8/2018 | Wankewycz | H02J 7/00 |
| 2019/0118973 A1* | 4/2019 | Di Benedetto | G06V 20/13 |
| 2019/0339720 A1* | 11/2019 | Petersen | G08G 5/0013 |
| 2020/0349852 A1* | 11/2020 | DiCosola | G08G 5/0043 |
| 2022/0395124 A1* | 12/2022 | Meddah | G08B 3/10 |

\* cited by examiner

FIG. 3B

SYSTEMS AND METHODS TO DISPLAY AN ELEVATED LANDING PORT FOR AN URBAN AIR MOBILITY VEHICLE

CROSS-REFERENCE TO RELATED APPLICATION(S)

This patent application claims the benefit of priority under 35 U.S.C. § 119 from Indian Patent Application No. 202111018082, filed on Apr. 19, 2021, the contents of which is incorporated by reference in its entirety.

TECHNICAL FIELD

Various embodiments of the present disclosure relate generally to systems and methods for determining and displaying a landing area for aerial vehicles.

BACKGROUND

An aerial vehicle, such as an Urban Air Mobility (UAM) vehicle, may be landed on ground, rooftop, or movable landing port. During a UAM landing, a pilot must evaluate if the vehicle may safely land, or if the landing attempt should be aborted based on the operating environment. The landing operation may be further complicated when the landing platform is placed on the building or movable platform. Rooftop landing ports may be available on hospital, residential, and/or commercial buildings which have their own landing procedure to be followed necessitating a maximum gross weight supported. In addition to ensuring the weight of the vehicle is supported, landing under zero visibility brownout conditions is challenging and conventional systems do not currently provide the necessary situational awareness to a vehicle crew.

The present disclosure is directed to overcoming one or more of these above-referenced challenges.

SUMMARY OF THE DISCLOSURE

According to certain aspects of the disclosure, systems and methods are disclosed for determining and displaying a landing port for a vehicle in a vicinity.

For instance, a method may include: determining, by one or more processors, a current position of the aircraft and a gross weight of the aircraft; determining, by the one or more processors, a landing port based on the current position of the aircraft; receiving, by the one or more processors, a set of parameters associated with the determined landing port; determining, by the one or more processors, an elevation of the determined landing port and a gross weight supported by the determined landing port at least based on the received parameters; determining, by the one or more processors, whether the aircraft is compatible with the landing port at least based on the determined elevation of the determined landing port and by comparing a gross weight of the aircraft with the gross weight supported by the determined landing port; and causing, by the one or more processors, display on a display device of the aircraft of an indication of the determination of whether the aircraft is compatible with the landing port.

A system may include: a display device including one or more screens; a memory storing instructions; and a processor executing the instructions to perform a process for providing a display to an operator of an aircraft including: determining, by one or more processors, a current position of the aircraft and a gross weight of the aircraft; determining, by the one or more processors, a landing port based on the current position of the aircraft; receiving, by the one or more processors, a set of parameters associated with the determined landing port; determining, by the one or more processors, an elevation of the determined landing port and a gross weight supported by the determined landing port at least based on the received parameters; determining, by the one or more processors, whether the aircraft is compatible with the landing port at least based on the determined elevation of the determined landing port and by comparing a gross weight of the aircraft with the gross weight supported by the determined landing port; and causing, by the one or more processors, display on a display device of the aircraft of an indication of the determination of whether the aircraft is compatible with the landing port.

A non-transitory computer-readable medium may store instructions that, when executed by a processor, cause the processor to perform a method. The method may include: determining, by one or more processors, a current position of the aircraft and a gross weight of the aircraft; determining, by the one or more processors, a landing port based on the current position of the aircraft; receiving, by the one or more processors, a set of parameters associated with the determined landing port; determining, by the one or more processors, an elevation of the determined landing port and a gross weight supported by the determined landing port at least based on the received parameters; determining, by the one or more processors, whether the aircraft is compatible with the landing port at least based on the determined elevation of the determined landing port and by comparing a gross weight of the aircraft with the gross weight supported by the determined landing port; and causing, by the one or more processors, display on a display device of the aircraft of an indication of the determination of whether the aircraft is compatible with the landing port.

Additional objects and advantages of the disclosed embodiments will be set forth in part in the description that follows, and in part will be apparent from the description, or may be learned by practice of the disclosed embodiments. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to automated cross-vehicle navigation using sensor data fusion.

In general, the present disclosure is directed to systems and methods for displaying an elevated landing port for a UAM. A system of the present disclosure may include a display of a number of features of the UAM landing port, including a landing port elevation, a landing port building type, a landing port traffic pattern, and a landing port gross weight support. The system of the UAM may determine a current position and configuration of the UAM, where the configuration of the UAM comprises machine settings as needed for a particular environment. The system may also retrieve details about a closest available landing port from a database, e.g., a UAM obstacles database, and/or other sources, such as onboard sensors, data linked information, etc.

In some embodiments, the system may also determine whether or not the closest available landing port is elevated. If the landing port is elevated, the system may display the elevated landing port with an associated altitude value.

In some embodiments, elevated landing ports may be depicted with a building type, either with a name of the building associated with the elevated landing port or with specified symbols. The system may also calculate a threshold of the UAM gross weight and the gross weight that is able to be supported by the landing port. If the landing port may accommodate the gross weight of the UAM, the displayed landing port symbol may be differentiated from a background with a color indication.

While this disclosure describes the systems and methods with reference to aircraft, it should be appreciated that the present systems and methods are applicable to management of vehicles, including those of drones, automobiles, ships, or any other autonomous and/or Internet-connected vehicle.

Figure 1:
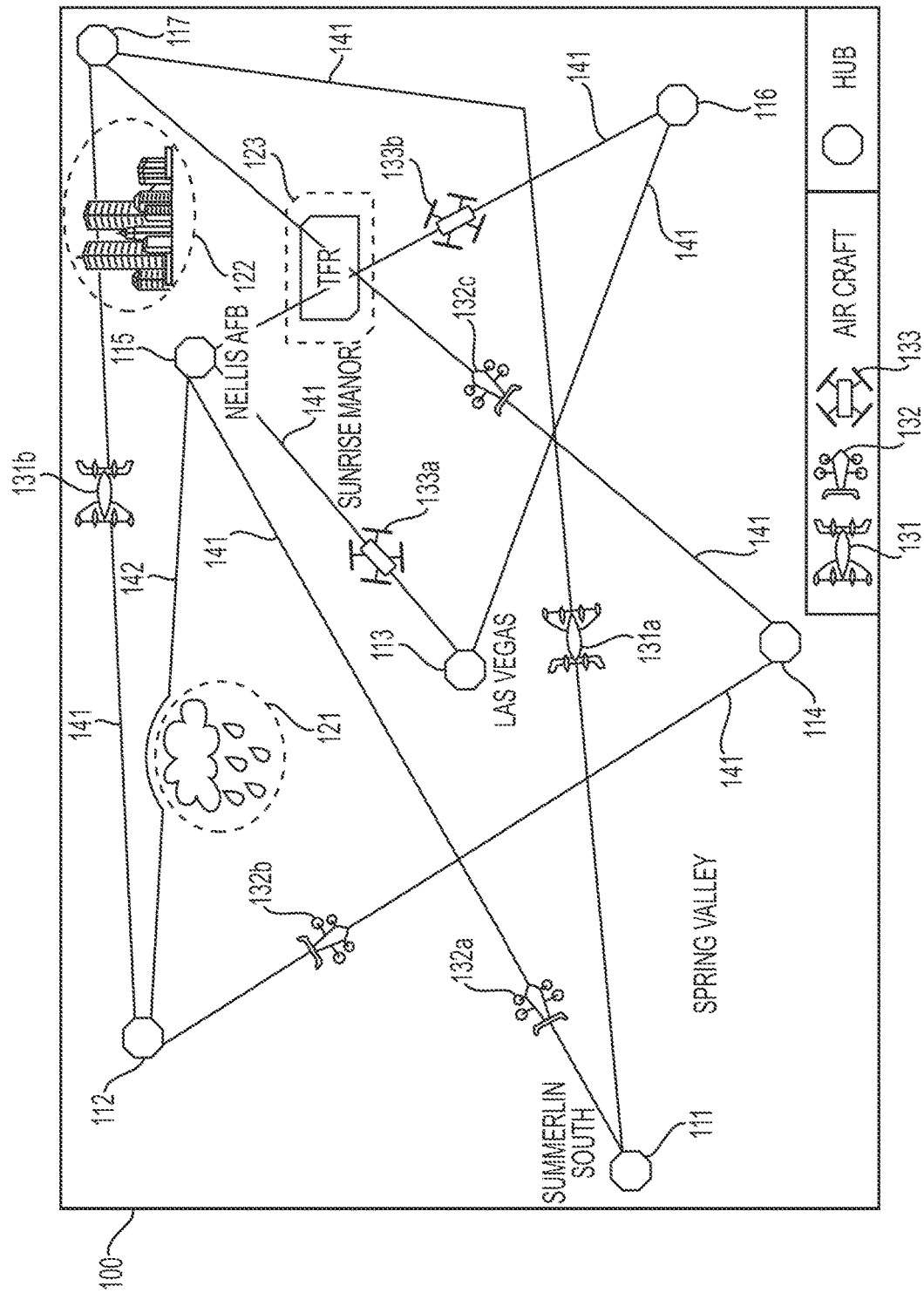
FIG. 1 depicts an example environment in which methods, systems, and other aspects of the present disclosure for automated cross-vehicle navigation may be implemented.

FIG. 1 depicts an example environment in which methods, systems, and other aspects of the present disclosure may be implemented. The environment of FIG. 1 may include an airspace 100 and one or more hubs 111-117. A hub, such as any one of 111-117, may be a ground facility where aircraft may take off, land, or remain parked (e.g., airport, vertiport, heliport, vertistop, helistop, temporary landing/takeoff facility, or the like). The airspace 100 may accommodate aircraft of various types 131-133 (collectively, "aircraft 131" unless indicated otherwise herein), flying at various altitudes and via various routes 141. An aircraft, such as any one of aircraft 131a-133b, may be any apparatus or vehicle of air transportation capable of traveling between two or more hubs 111-117, such as an airplane, a vertical take-off and landing aircraft (VTOL), a drone, a helicopter, an unmanned aerial vehicle (UAV), a hot-air balloon, a military aircraft, etc. Any one of the aircraft 131a-133b may be connected to one another and/or to one or more of the hubs 111-117, over a communication network, using a vehicle management computer corresponding to each aircraft or each hub. Each vehicle management computer may comprise a computing device and/or a communication device, as described in more detail below in FIGS. 3A and 3B. As shown in FIG. 1, different types of aircraft that share the airspace 100 are illustrated, which are distinguished, by way of example, as model 131 (aircraft 131a and 131b), model 132 (aircraft 132a, 132b, and 132c), and model 133 (aircraft 133a and 133b).

As further shown in FIG. 1, an airspace 100 may have one or more weather constraints 121, spatial restrictions 122 (e.g., buildings), and temporary flight restrictions (TFR) 123. These are exemplary factors that a vehicle management computer of an aircraft may be required to consider and/or analyze in order to derive the safest and optimal flight trajectory of the aircraft. For example, if a vehicle management computer of an aircraft planning to travel from hub 112 to hub 115 predicts that the aircraft may be affected by an adverse weather condition, such as weather constraint 121, in the airspace, the vehicle management computer may modify a direct path (e.g., the route 141 between hub 112 and hub 115) with a slight curvature away from the weather constraint 121 (e.g., a northward detour) to form a deviated route 142. For instance, the deviated route 142 may ensure that the path and the time of the aircraft (e.g., 4-D coordinates of the flight trajectory) do not intersect any position and time coordinates of the weather constraint 121 (e.g., 4-D coordinates of the weather constraint 121).

As another example, the vehicle management computer of aircraft 131b may predict, prior to take-off, that spatial restriction 122, caused by buildings, would hinder the direct flight path of aircraft 131b flying from hub 112 to hub 117, as depicted in FIG. 1. In response to that prediction, the vehicle management computer of aircraft 131b may generate a 4-D trajectory with a vehicle path that bypasses a 3-dimensional zone (e.g., zone including the location and the altitude) associated with those particular buildings. As yet another example, the vehicle management computer of aircraft 133b may predict, prior to take-off, that TFR 123, as well as some potential 4-D trajectories of another aircraft 132c, would hinder or conflict with the direct flight path of aircraft 133b, as depicted in FIG. 1. In response, the vehicle management computer of aircraft 133b may generate a 4-D trajectory with path and time coordinates that do not intersect either the 4-D coordinates of the TFR 123 or the 4-D trajectory of the other aircraft 132c. In this case, the TFR 123 and collision risk with another aircraft 132c are examples of dynamic factors which may or may not be in effect, depending on the scheduled time of travel, the effective times of TFR, and the path and schedule of the other aircraft 132c. As described in these examples, the 4-D trajectory derivation process, including any modification or re-negotiation, may be completed prior to take-off of the aircraft.

As another example, the vehicle management computer of aircraft 131b may determine to use one of the routes 141 that are set aside for aircraft 131 to use, either exclusively or non-exclusively. The aircraft 131b may generate a 4-D trajectory with a vehicle path that follows one of the routes 141.

As indicated above, FIG. 1 is provided merely as an example environment of an airspace that includes exemplary types of aircraft, hubs, zones, restrictions, and routes. Regarding particular details of the aircraft, hubs, zones, restrictions, and routes, other examples are possible and may differ from what was described with respect to FIG. 1. For example, types of zones and restrictions which may become a factor in trajectory derivation, other than those described above, may include availability of hubs, reserved paths or sky lanes (e.g., routes 141), any ground-originating obstacle which extends out to certain levels of altitudes, any known zones of avoidance (e.g., noise sensitive zones), air transport regulations (e.g., closeness to airports), etc. Any factor that renders the 4-D trajectory to be modified from the direct or the shortest path between two hubs may be considered during the derivation process.

Figure 2:
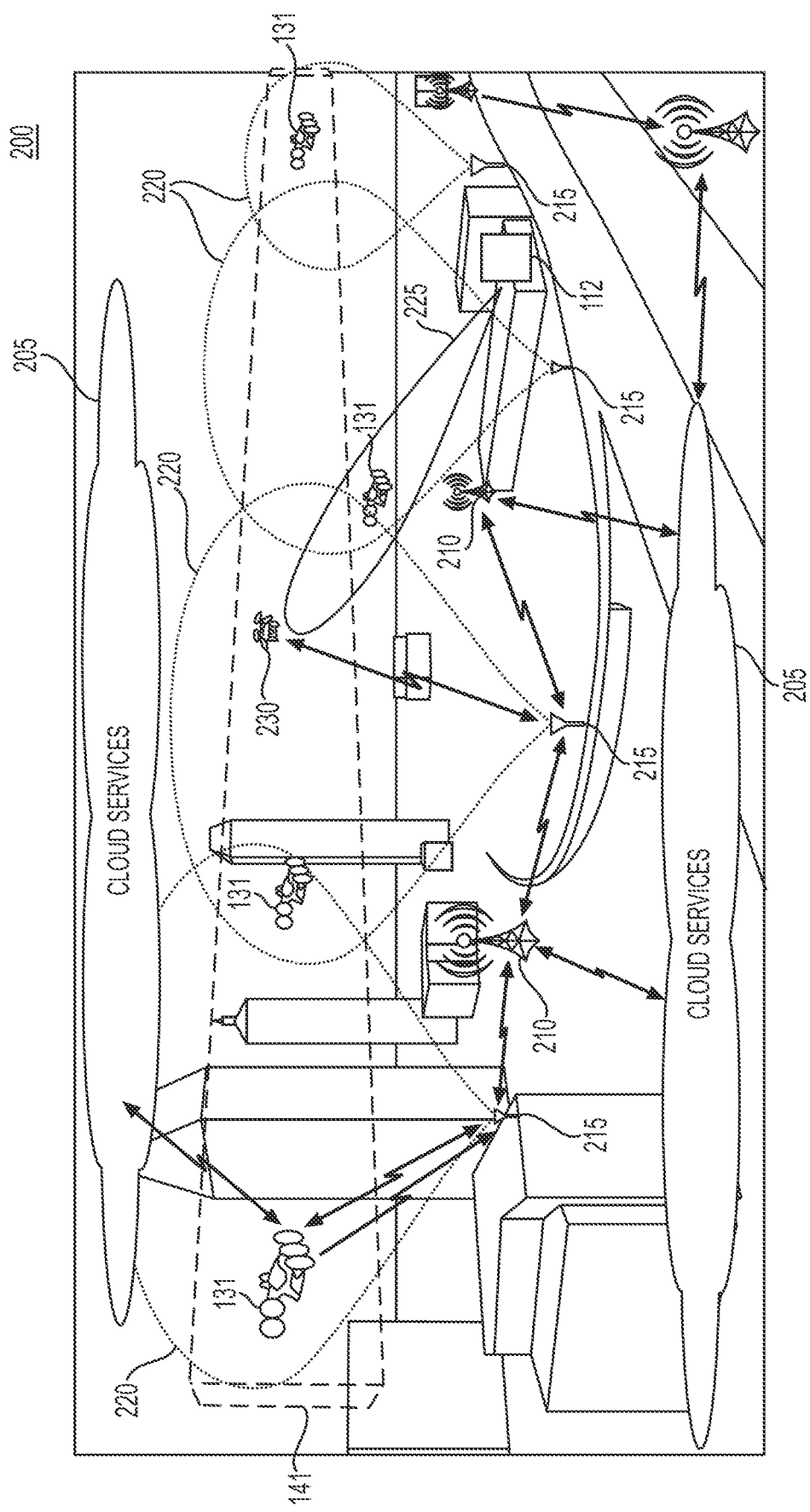
FIG. 2 depicts an exemplary a system for automated cross-vehicle navigation, according to one or more embodiments.

FIG. 2 depicts an exemplary a system, according to one or more embodiments. The system 200 depicted in FIG. 2 may include one or more aircraft, such as aircraft 131, one or more intruder aircraft 230, a cloud service 205, one or more communications station(s) 210, and/or one or more ground station(s) 215. The one or more aircraft 131 may be traveling from a first hub (e.g., hub 114) to a second hub (e.g., hub 112) along a route of routes 141. Between, near, and/or on hubs, such as hubs 111-117, the one or more ground station(s) 215 may be distributed (e.g., evenly, based on traffic considerations, etc.) along/near/on/under routes 141. Between, near, and/or on hubs, such as hubs 111-117, the one or more communications station(s) 210 may be distributed (e.g., evenly, based on traffic considerations, etc.). Some (or all) of the one or more ground station(s) 215 may be paired with a communication station 210 of the one or more communications station(s) 210.

Each of the one or more ground station(s) 215 may include a transponder system, a radar system, and/or a datalink system.

The radar system of a ground station 215 may include a directional radar system. The directional radar system may be pointed upward (e.g., from ground towards sky) and the directional radar system may transmit a beam 220 to provide three-dimensional coverage over a section of a route 141. The beam 220 may be a narrow beam. The three-dimensional coverage of the beam 220 may be directly above the ground station 215 or at various skewed angles (from a vertical direction). The directional radar system may detect objects, such as aircraft 131, within the three-dimensional coverage of the beam 220. The directional radar system may detect objects by skin detection. In the case of the ground station 215 being positioned on a hub, such as the hub 112, the directional radar system may transmit a beam 225 to provide three-dimensional coverage over the hub 112. The beam 225 may be also be skewed at an angle (from a vertical direction) to detect objects arriving at, descending to, and landing on the hub 112. The beams 220/225 may be controlled either mechanically (by moving the radar system), electronically (e.g., phased arrays), or by software (e.g., digital phased array radars), or any combination thereof.

The transponder system of a ground station 215 may include an ADS-B and/or a Mode S transponder, and/or other transponder system (collectively, interrogator system). The interrogator system may have at least one directional antenna. The directional antenna may target a section of a route 141. For instance, targeting the section of the route 141 may reduce the likelihood of overwhelming the ecosystem (e.g., aircraft 131) with interrogations, as would be the case if the interrogator system used an omnidirectional antenna. The directional antenna may target a specific section of a route 141 by transmitting signals in a same or different beam pattern as the beam 220/225 discussed above for the radar system. The interrogator system may transmit interrogation messages to aircraft, such as aircraft 131, within the section of the route 141. The interrogation messages may include an identifier of the interrogator system and/or request the aircraft, such as aircraft 131, to transmit an identification message. The interrogator system may receive the identification message from the aircraft, such as aircraft 131. The identification message may include an identifier of the aircraft and/or transponder aircraft data (e.g., speed, position, track, etc.) of the aircraft.

If the radar system detects an object and the transponder system does not receive a corresponding identification message from the object (or does receive an identification message, but it is an invalid identification message, e.g., an identifier of un-authorized aircraft), the ground station 215 may determine that the object is an intruder aircraft 230. The ground station 215 may then transmit an intruder alert message to the cloud service 205. If the radar system detects an object and the transponder system receives a corresponding identification message from the object, the ground station 215 may determine the object is a valid aircraft. The ground station 215 may then transmit a valid aircraft message to the cloud service 205. Additionally or alternatively, the ground station 215 may transmit a detection message based on the detection of the object and whether the ground station 215 receives the identification message ("a response message"); therefore, the ground station 215 may not make a determination as to whether the detected object is an intruder aircraft or a valid aircraft, but instead send the detection message to the cloud service 205 for the cloud service 205 to determine whether the detected object is an intruder aircraft or a valid aircraft.

The datalink system of ground station 215 may communicate with at least one of the one or more communications station(s) 210. Each of the one or more communications station(s) 210 may communicate with at least one of the one or more ground station(s) 215 within a region around the communications station 210 to receive and transmit data from/to the one or more ground station(s) 215. Some or none of the communications station(s) 210 may not communicate directly with the ground station(s) 215, but may instead be relays from other communications station(s) 210 that are in direct communication with the ground station(s) 215. For instance, each of the ground station(s) 215 may communicate with a nearest one of the communications station(s) 210 (directly or indirectly). Additionally or alternatively, the ground station(s) 215 may communicate with a communications station 210 that has a best signal to the ground station 215, best bandwidth, etc. The one or more communications station(s) 210 may include a wireless communication system to communicate with the datalink system of ground station(s) 215. The wireless communication system may enable cellular communication, in accordance with, e.g., 3G/4G/5G standards. The wireless communication system may enable Wi-Fi communications, Bluetooth communications, or other short range wireless communications. Additionally or alternatively, the one or more communications station(s) 210 may communicate with the one or more of the one or more ground station(s) 215 based on wired communication, such as Ethernet, fiber optic, etc.

For instance, a ground station 215 may transmit an intruder alert message or a valid aircraft message (and/or a detection message) to a communications station 210. The communications station 210 may then relay the intruder alert message or the valid aircraft message (and/or the detection message) to the cloud service 205 (either directly or indirectly through another communications station 210).

The one or more communications station(s) 210 may also communicate with one or more aircraft, such as aircraft 131, to receive and transmit data from/to the one or more aircraft. For instance, one or more communications station(s) 210 may relay data between the cloud service 205 and a vehicle, such as aircraft 131.

The cloud service 205 may communicate with the one or more communications station(s) 210 and/or directly (e.g., via satellite communications) with aircraft, such as aircraft 131. The cloud service 205 may provide instructions, data, and/or warnings to the aircraft 131. The cloud service 205 may receive acknowledgements from the aircraft 131, aircraft data from the aircraft 131, and/or other information from the aircraft 131. For instance, the cloud service 205 may provide, to the aircraft 131, weather data, traffic data, landing zone data for the hubs, such as hubs 111-117, updated obstacle data, flight plan data, etc. The cloud service 205 may also provide software as a service (SaaS) to aircraft 131 to perform various software functions, such as navigation services, Flight Management System (FMS) services, etc., in accordance with service contracts, API requests from aircraft 131, etc.

Figure 3A:
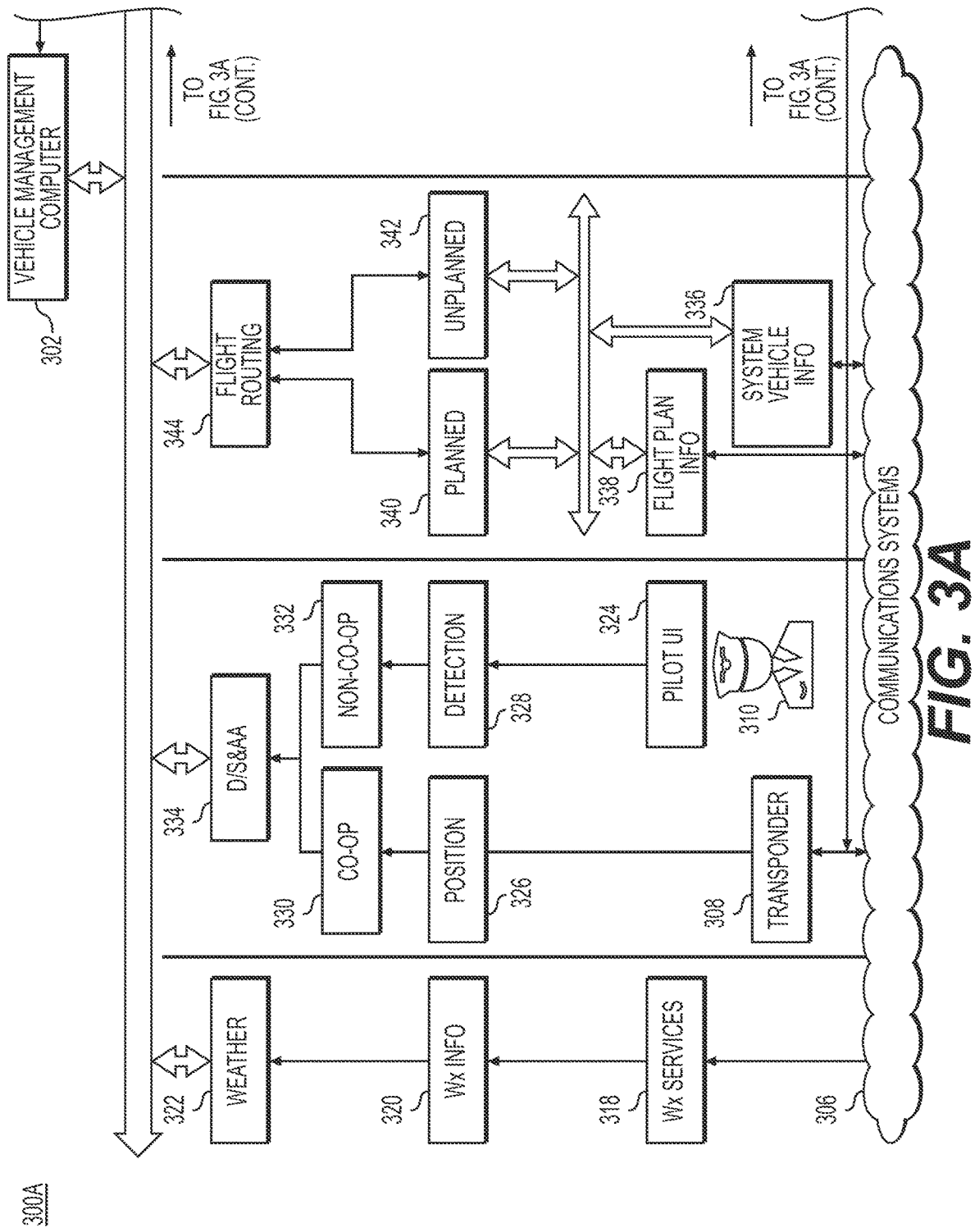
FIGS. 3A and 3B depict exemplary block diagrams of vehicle and computing systems for automated cross-vehicle navigation, according to one or more embodiments.
Figure 3A:
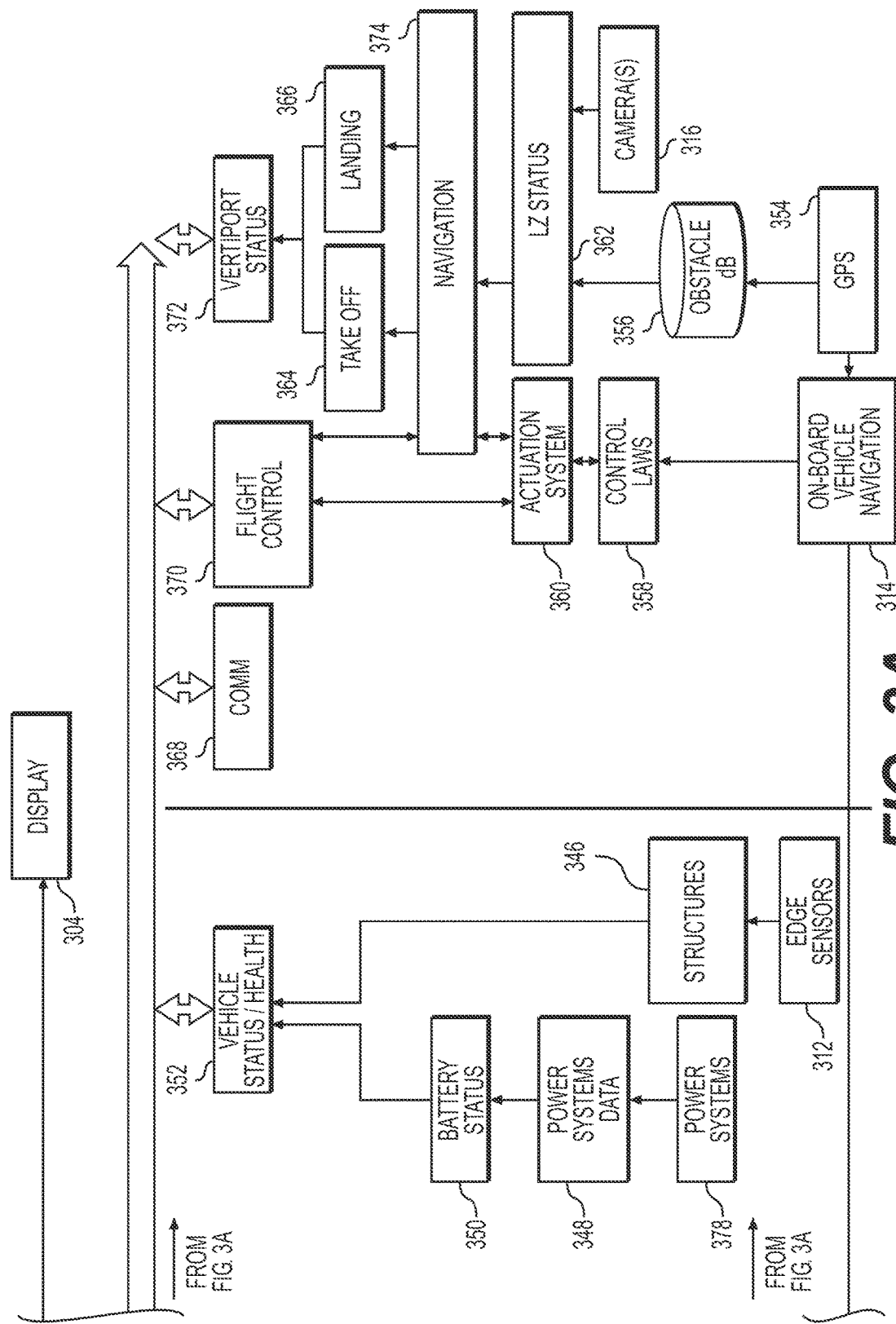
Figure 3B:
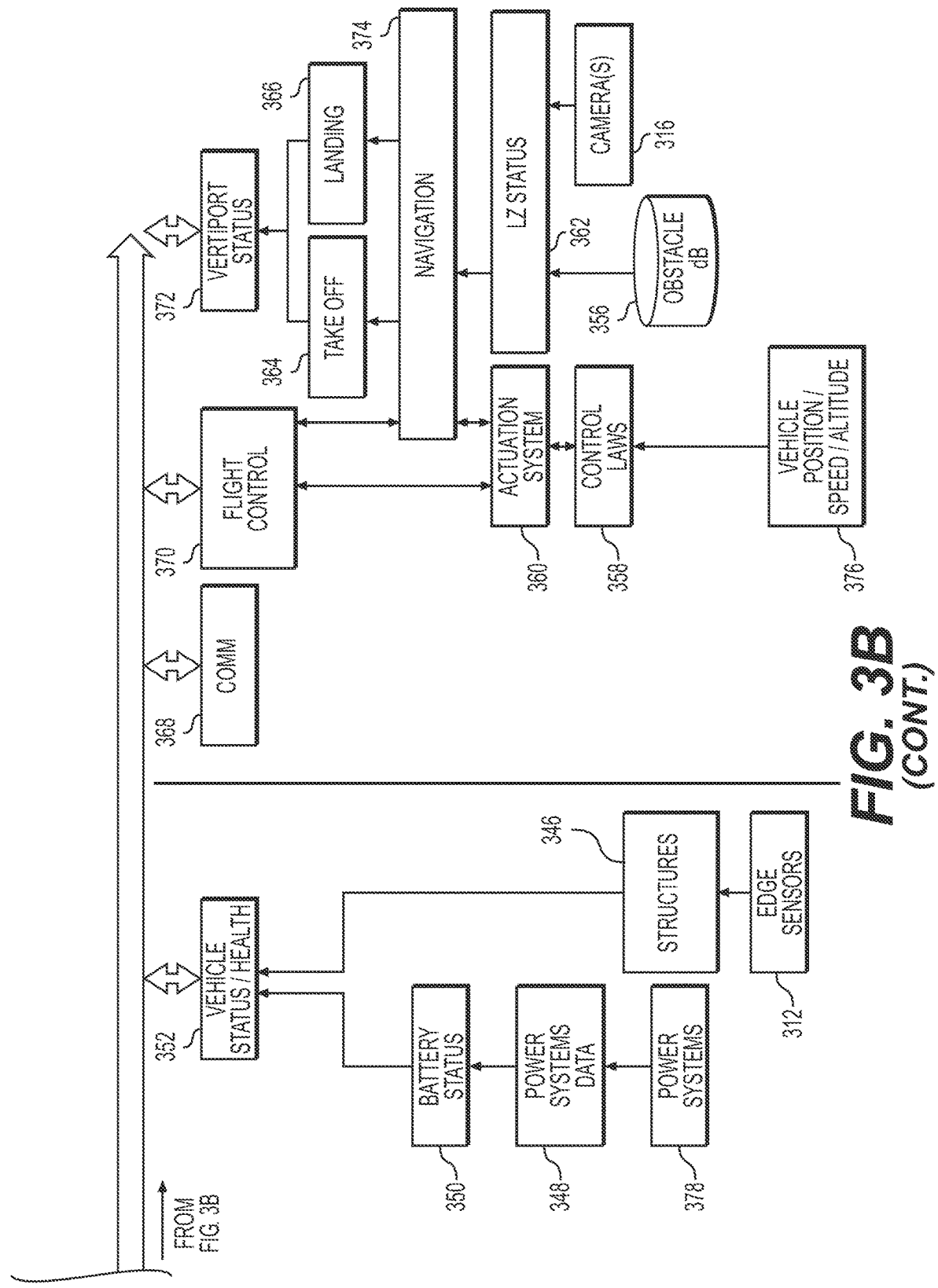

FIGS. 3A and 3B depict exemplary block diagrams of a vehicle of a system, according to one or more embodiments. FIG. 3A may depict a block diagram 300A and FIG. 3B may depict a block diagram 300B, respectively, of a vehicle, such as aircraft 131-133. Generally, the block diagram 300A may depict systems, information/data, and communications between the systems of a piloted or semi-autonomous vehicle, while the block diagram 300B may depict systems, information/data, and communications between the systems of a fully autonomous vehicle. The aircraft 131 may be one of the piloted or semi-autonomous vehicle and/or the fully autonomous vehicle.

The block diagram 300A of an aircraft 131 may include a vehicle management computer 302 and electrical, mechanical, and/or software systems (collectively, "vehicle systems"). The vehicle systems may include: one or more display(s) 304; communications systems 306; one or more transponder(s) 308; pilot/user interface(s) 324 to receive and communicate information from pilots and/or users 310 of the aircraft 131; edge sensors 312 on structures 346 of the aircraft 131 (such as doors, seats, tires, etc.); power systems 378 to provide power to actuation systems 360; camera(s) 316; GPS systems 354; on-board vehicle navigation systems 314; flight control computer 370; and/or one or more data storage systems. The vehicle management computer 302 and the vehicle systems may be connected by one or a combination of wired or wireless communication interfaces, such as TCP/IP communication over Wi-Fi or Ethernet (with or without switches), RS-422, ARINC-429, or other communication standards (with or without protocol switches, as needed).

The vehicle management computer 302 may include at least a network interface, a processor, and a memory, each coupled to each other via a bus or indirectly via wired or wireless connections (e.g., Wi-Fi, Ethernet, parallel or serial ATA, etc.). The memory may store, and the processor may execute, a vehicle management program. The vehicle management program may include a weather program 322, a Detect/Sense and Avoid (D/S & A) program 334, a flight routing program 344, a vehicle status/health program 352, a communications program 368, a flight control program 370, and/or a vertiport status program 372 (collectively, "subprograms"). The vehicle management program may obtain inputs from the sub-programs and send outputs to the sub-programs to manage the aircraft 131, in accordance with program code of the vehicle management program. The vehicle management program may also obtain inputs from the vehicle systems and output instructions/data to the vehicle systems, in accordance with the program code of the vehicle management program.

The vehicle management computer 302 may transmit instructions/data/graphical user interface(s) to the one or more display(s) 304 and/or the pilot/user interface(s) 324. The one or more display(s) 304 and/or the pilot/user interface(s) 324 may receive user inputs, and transmit the user inputs to the vehicle management computer 302.

The communications systems 306 may include various data links systems (e.g., satellite communications systems), cellular communications systems (e.g., LTE, 4G, 5G, etc.), radio communications systems (e.g., HF, VHF, etc.), and/or wireless local area network communications systems (e.g., Wi-Fi, Bluetooth, etc.). The communications systems 306 may enable communications, in accordance with the communications program 368, between the aircraft 131 and external networks, services, and the cloud service 205, discussed above. An example of the external networks may include a wide area network, such as the internet. Examples of the services may include weather information services 318, traffic information services, etc.

The one or more transponder(s) 308 may include an interrogator system. The interrogator system of the aircraft 131 may be an ADS-B, a Mode S transponder, and/or other transponder system. The interrogator system may have an omnidirectional antenna and/or a directional antenna (interrogator system antenna). The interrogator system antenna may transmit/receive signals to transmit/receive interrogation messages and transmit/receive identification messages. For instance, in response to receiving an interrogation message, the interrogator system may obtain an identifier of the aircraft 131 and/or transponder aircraft data (e.g., speed, position, track, etc.) of the aircraft 131, e.g., from the on-board vehicle navigation systems 314; and transmit an identification message. Contra-wise, the interrogator system may transmit interrogation messages to nearby aircraft; and receive identification messages. The one or more transponder(s) 308 may send messages to the vehicle management computer 302 to report interrogation messages and/or identification messages received from/transmitted to other aircraft and/or the ground station(s) 215. As discussed above, the interrogation messages may include an identifier of the interrogator system (in this case, the aircraft 131), request the nearby aircraft to transmit an identification message, and/or (different than above) transponder aircraft data (e.g., speed, position, track, etc.) of the aircraft 131; the identification message may include an identifier of the aircraft 131 and/or the transponder aircraft data of the aircraft 131.

The edge sensors 312 on the structures 346 of the aircraft 131 may be sensors to detect various environmental and/or system status information. For instance, some of the edge sensors 312 may monitor for discrete signals, such as edge sensors on seats (e.g., occupied or not), doors (e.g., closed or not), etc. of the aircraft 131. Some of the edge sensors 312 may monitor continuous signals, such as edge sensors on tires (e.g., tire pressure), brakes (e.g., engaged or not, amount of wear, etc.), passenger compartment (e.g., compartment air pressure, air composition, temperature, etc.), support structure (e.g., deformation, strain, etc.), etc., of the aircraft 131. The edge sensors 312 may transmit edge sensor data to the vehicle management computer 302 to report the discrete and/or continuous signals.

The power systems 378 may include one or more battery systems, fuel cell systems, and/or other chemical power systems to power the actuation systems 360 and/or the vehicle systems in general. In one aspect of the disclosure, the power systems 378 may be a battery pack. The power systems 378 may have various sensors to detect one or more of temperature, fuel/electrical charge remaining, discharge rate, etc. (collectively, power system data 348). The power systems 378 may transmit power system data 348 to the vehicle management computer 302 so that power system status 350 (or battery pack status) may be monitored by the vehicle status/health program 352.

The actuation systems 360 may include: motors, engines, and/or propellers to generate thrust, lift, and/or directional force for the aircraft 131; flaps or other surface controls to augment the thrust, lift, and/or directional force for the aircraft 131; and/or aircraft mechanical systems (e.g., to deploy landing gear, windshield wiper blades, signal lights, etc.). The vehicle management computer 302 may control the actuation systems 360 by transmitting instructions, in accordance with the flight control program 370, and the actuation systems 360 may transmit feedback/current status of the actuation systems 360 to the vehicle management computer 302 (which may be referred to as actuation systems data).

The camera(s) 316 may include inferred or optical cameras, LIDAR, or other visual imaging systems to record internal or external environments of the aircraft 131. The camera(s) 316 may obtain inferred images; optical images; and/or LIDAR point cloud data, or any combination thereof (collectively "imaging data"). The LIDAR point cloud data may include coordinates (which may include, e.g., location, intensity, time information, etc.) of each data point received by the LIDAR. The camera(s) 316 and/or the vehicle management computer 302 may include a machine vision function. The machine vision function may process the obtained imaging data to detect objects, locations of the detected objects, speed/velocity (relative and/or absolute) of the detected objects, size and/or shape of the detected objects, etc. (collectively, "machine vision outputs"). For instance, the machine vision function may be used to image a landing zone to confirm the landing zone is clear/unobstructed (a landing zone (LZ) status 362). Additionally or alternatively, the machine vision function may determine whether physical environment (e.g., buildings, structures, cranes, etc.) around the aircraft 131 and/or on/near the routes 141 may be or will be (e.g., based on location, speed, flight plan of the aircraft 131) within a safe flight envelope of the aircraft 131. The imaging data and/or the machine vision outputs may be referred to as "imaging output data." The camera(s) 316 may transmit the imaging data and/or the machine vision outputs of the machine vision function to the vehicle management computer 302. The camera(s) 316 may determine whether elements detected in the physical environment are known or unknown based on obstacle data stored in an obstacle database 356, such as by determining a location of the detected object and determining if an obstacle in the obstacle database has the same location (or within a defined range of distance). The imaging output data may include any obstacles determined to not be in the obstacle data of the obstacle database 356 (unknown obstacles information).

The GPS systems 354 may include one or more global navigation satellite (GNSS) receivers. The GNSS receivers may receive signals from the United States developed Global Position System (GPS), the Russian developed Global Navigation Satellite System (GLONASS), the European Union developed Galileo system, and/or the Chinese developed BeiDou system, or other global or regional satellite navigation systems. The GNSS receivers may determine positioning information for the aircraft 131. The positioning information may include information about one or more of position (e.g., latitude and longitude, or Cartesian coordinates), altitude, speed, heading, or track, etc. for the vehicle. The GPS systems 354 may transmit the positioning information to the on-board vehicle navigation systems 314 and/or to the vehicle management computer 302.

The on-board vehicle navigation systems 314 may include one or more radar(s), one or more magnetometer(s), an altitude heading reference system (AHRS), one or more inertial measurement units (IMUs), and/or one or more air data module(s). The one or more radar(s) may be weather radar(s) to scan for weather and/or digital phased array radar(s) (either omnidirectional and/or directional) to scan for terrain/ground/objects/obstacles. The one or more radar(s) (collectively "radar systems") may obtain radar information. The radar information may include information about the local weather and the terrain/ground/objects/obstacles (e.g., aircraft or obstacles and associated locations/movement). The one or more magnetometer(s) may measure magnetism to obtain bearing information for the aircraft 131. The AHRS may include sensors (e.g., three sensors on three axes) to obtain attitude information for the aircraft 131. The attitude information may include roll, pitch, and yaw of the aircraft 131. The one or more IMUs may each include one or more accelerometer(s), one or more gyroscope(s), and/or one or more magnetometer(s) to determine current position and/or current orientation based on integration of acceleration from the one or more accelerometer(s), angular rate from the one or more gyroscope(s), and the orientation of the body from the one or more magnetometer(s). The current position and current orientation may be IMU information. The air data module(s) may sense external air pressure to obtain airspeed information for the aircraft 131. The radar information, the bearing information, the attitude information, the IMU information, the airspeed information, and/or the positioning information (collectively, navigation information) may be transmitted to the vehicle management computer 302.

The weather program 322 may, using the communications systems 306, transmit and/or receive weather information from one or more of the weather information services 318. For instance, the weather program 322 may obtain local weather information from weather radars and the on-board vehicle navigation systems 314, such as the air data module(s). The weather program may also transmit requests for weather information 320. For instance, the request may be for weather information 320 along a route 141 of the aircraft 131 (route weather information). The route weather information may include information about precipitation, wind, turbulence, storms, cloud coverage, visibility, etc. of the external environment of the aircraft 131 along/near a flight path, at a destination and/or departure location (e.g., one of the hubs 111-117), or for a general area around the flight path, destination location, and/or departure location. The one or more of the weather information services 318 may transmit responses that include the route weather information. Additionally or alternatively, the one or more of the weather information services 318 may transmit update messages to the aircraft 131 that includes the route weather information and/or updates to the route weather information.

The DS & AA program 334 may, using the one or more transponders 308 and/or the pilot/user interface(s) 324, detect and avoid objects that may pose a potential threat to the aircraft 131. As an example, the pilot/user interface(s) 324 may receive user input(s) from the pilots and/or users of the vehicle 310 (or radar/imaging detection) to indicate a detection of an object; the pilot/user interface(s) 324 (or radar/imaging detection) may transmit the user input(s) (or radar or imaging information) to the vehicle management computer 302; the vehicle management computer 302 may invoke the D/S & A program 334 to perform an object detection process 328 to determine whether the detected object is a non-cooperative object 332 (e.g., it is an aircraft that is not participating in transponder communication); optionally, the vehicle management computer 302 may determine a position, speed, track for the non-cooperative object 332 (non-cooperative object information), such as by radar tracking or image tracking; in response to determining the object is a non-cooperative object 332, the vehicle management computer 302 may determine a course of action, such as instruct the flight control program 370 to avoid the non-cooperative object 332. As another example, the one or more transponder(s) 308 may detect an intruder aircraft (such as intruder aircraft 230) based on an identification message from the intruder aircraft; the one or more transponder(s) 308 may transmit a message to the vehicle management computer 302 that includes the identification message from the intruder aircraft; the vehicle management computer 302 may extract an identifier and/or transponder aircraft data from the identification message to obtain the identifier and/or speed, position, track, etc. of the intruder aircraft; the vehicle management computer 302 may invoke the D/S & A program 334 to perform a position detection process 326 to determine whether the detected object is a cooperative object 330 and its location, speed, heading, track, etc.; in response to determining the object is a cooperative object 330, the vehicle management computer 302 may determine a course of action, such as instruct the flight control program 370 to avoid the cooperative object 330. For instance, the course of action may be different or the same for non-cooperative and cooperative objects 330/332, in accordance with rules based on regulations and/or scenarios.

The flight routing program 344 may, using the communications systems 306, generate/receive flight plan information 338 and receive system vehicle information 336 from the cloud service 205. The flight plan information 338 may include a departure location (e.g., one of the hubs 111-117), a destination location (e.g., one of the hubs 111-117), intermediate locations (if any) (e.g., waypoints or one or more of the hubs 111-117) between the departure and destination locations, and/or one or more routes 141 to be used (or not used). The system vehicle information 336 may include other aircraft positioning information for other aircraft with respect to the aircraft 131 (called a "receiving aircraft 131" for reference). For instance, the other aircraft positioning information may include positioning information of the other aircraft. The other aircraft may include: all aircraft 131-133 and/or intruder aircraft 230; aircraft 131-133 and/or intruder aircraft 230 within a threshold distance of the receiving aircraft 131; aircraft 131-133 and/or intruder aircraft 230 using a same route 141 (or is going to use the same route 141 or crossing over the same route 141) of the receiving aircraft; and/or aircraft 131-133 and/or intruder aircraft 230 within a same geographic area (e.g., city, town, metropolitan area, or sub-division thereof) of the receiving aircraft.

The flight routing program 344 may determine or receive a planned flight path 340. The flight routing program 344 may receive the planned flight path 340 from another aircraft 131 or the cloud service 205 (or other service, such as an operating service of the aircraft 131). The flight routing program 344 may determine the planned flight path 340 using various planning algorithms (e.g., flight planning services on-board or off-board the aircraft 131), aircraft constraints (e.g., cruising speed, maximum speed, maximum/minimum altitude, maximum range, etc.) of the aircraft 131, and/or external constraints (e.g., restricted airspace, noise abatement zones, etc.). The planned/received flight path may include a 4-D trajectory of a flight trajectory with 4-D coordinates, a flight path based on waypoints, any suitable flight path for the aircraft 131, or any combination thereof, in accordance with the flight plan information 338 and/or the system vehicle information 336. The 4-D coordinates may include 3-D coordinates of space (e.g., latitude, longitude, and altitude) for a flight path and time coordinate.

The flight routing program 344 may determine an unplanned flight path 342 based on the planned flight path 340 and unplanned event triggers, and using the various planning algorithms, the aircraft constraints of the aircraft 131, and/or the external constraints. The vehicle management computer 302 may determine the unplanned event triggers based on data/information the vehicle management compute 302 receives from other vehicle systems or from the cloud service 205. The unplanned event triggers may include one or a combination of: (1) emergency landing, as indicated by the vehicle status/health program 352 discussed below or by a user input to one or more display(s) 304 and/or the pilot/user interface(s) 324; (2) intruder aircraft 230, cooperative object 330, or non-cooperative object 332 encroaching on a safe flight envelope of the aircraft 131; (3) weather changes indicated by the route weather information (or updates thereto); (4) the machine vision outputs indicating a portion of the physical environment may be or will be within the safe flight envelope of the aircraft 131; and/or (5) the machine vision outputs indicating a landing zone is obstructed.

Collectively, the unplanned flight path 342/the planned flight path 340 and other aircraft positioning information may be called flight plan data.

The vehicle status/health program 352 may monitor vehicle systems for status/health, and perform actions based on the monitored status/health, such as periodically report status/health, indicate emergency status, etc. The vehicle may obtain the edge sensor data and the power system data 348. The vehicle status/health program 352 may process the edge sensor data and the power system data 348 to determine statuses of the power system 378 and the various structures and systems monitored by the edge sensors 312, and/or track a health of the power system 378 and structures and systems monitored by the edge sensors 312. For instance, the vehicle status/health program 352 may obtain the power systems data 348; determine a battery status 350; and perform actions based thereon, such as reduce consumption of non-essential systems, report battery status, etc. The vehicle status/health program 352 may determine an emergency landing condition based on one or more of the power system 378 and structures and systems monitored by the edge sensors 312 has a state that indicates the power system 378 and structures and systems monitored by the edge sensors 312 has or will fail soon. Moreover, the vehicle status/health program 352 may transmit status/health data to the cloud service 205 as status/health messages (or as a part of other messages to the cloud service). The status/health data may include the actuation systems data, all of the edge sensor data and/or the power system data, portions thereof, summaries of the edge sensor data and the power system data, and/or system status indicators (e.g., operating normal, degraded wear, inoperable, etc.) based on the edge sensor data and the power system data.

The flight control program 370 may control the actuation system 360 in accordance with the unplanned flight path 342/the planned flight path 340, the other aircraft positioning information, control laws 358, navigation rules 374, and/or user inputs (e.g., of a pilot if aircraft 131 is a piloted or semi-autonomous vehicle). The flight control program 370 may receive the planned flight path 340/unplanned flight path 342 and/or the user inputs (collectively, "course"), and determine inputs to the actuation system 360 to change speed, heading, attitude of the aircraft 131 to match the course based on the control laws 358 and navigation rules 374. The control laws 358 may dictate a range of actions possible of the actuation system 360 and map inputs to the range of actions to effectuate the course by, e.g., physics of flight of the aircraft 131. The navigation rules 374 may indicate acceptable actions based on location, waypoint, portion of flight path, context, etc. (collectively, "circumstance"). For instance, the navigation rules 374 may indicate a minimum/maximum altitude, minimum/maximum speed, minimum separation distance, a heading or range of acceptable headings, etc. for a given circumstance.

The vertiport status program 372 may control the aircraft 131 during takeoff (by executing a takeoff process 364) and during landing (by executing a landing process 366). The takeoff process 364 may determine whether the landing zone from which the aircraft 131 is to leave and the flight environment during the ascent is clear (e.g., based on the control laws 358, the navigation rules 374, the imaging data, the obstacle data, the unplanned flight path 342/the planned flight path 340, the other aircraft positioning information, user inputs, etc.), and control the aircraft or guide the pilot through the ascent (e.g., based on the control laws 358, the navigation rules 374, the imaging data, the obstacle data, the flight plan data, user inputs, etc.). The landing process 366 may determine whether the landing zone on which the aircraft 131 is to land and the flight environment during the descent is clear (e.g., based on the control laws 358, the navigation rules 374, the imaging data, the obstacle data, the flight plan data, user inputs, the landing zone status, etc.), and control the aircraft or guide the pilot through the descent (e.g., based on the control laws 358, the navigation rules 374, the imaging data, the obstacle data, the flight plan data, user inputs, the landing zone status, etc.).

The one or more data storage systems may store data/information received, generated, or obtained onboard the aircraft. The one or more data storage systems may also store software for one or more of the computers onboard the aircraft.

The block diagram 300B may be the same as the block diagram 300A, but the block diagram 300B may omit the pilot/user interface(s) 324 and/or the one or more displays 304, and include a vehicle position/speed/altitude system 376. The vehicle position/speed/altitude system 376 may include or not include the on-board vehicle navigation systems 314 and/or the GPS systems 354, discussed above. In the case that the vehicle position/speed/altitude system 376 does not include the on-board vehicle navigation systems 314 and/or the GPS systems 354, the vehicle position/speed/altitude system 376 may obtain the navigation information from the cloud service 205.

In one aspect of the disclosure, the ground station(s) 215 (referred to as "node" or "nodes") may control the radar systems and the interrogator systems of the respective nodes to scan for vehicles, such as aircraft 131, in a three-dimensional coverage of a beam 220 of the nodes; detect vehicles, such as aircraft 131, using radar return information from the radar systems or based on interrogator signals of the interrogator systems; and in response to detecting the vehicles, transmit detection messages to the cloud service 205.

For instance, a node may scan and detect vehicles in various sequences using the interrogator systems and the radar systems. In one aspect of the disclosure, a node may scan for vehicles using the radar systems to detect a vehicle; interrogate a detected vehicle using the interrogator systems; wait for a response (e.g., identification messages) from the detected vehicle; and transmit a detection message to the cloud service 205, based on whether a response is received. In another aspect of the disclosure, in addition or as an alternative, the node may scan for vehicles by transmitting interrogation messages using the interrogator systems; await a response from a vehicle using the interrogator systems; optionally, confirm the vehicle position, speed, track, etc. using the radar systems; and transmit a detection message to the cloud service 205. In another aspect of the disclosure, in addition or as an alternative, the node may receive interrogator messages from vehicles; respond to the vehicles; optionally, confirm the vehicle position, speed, track, etc. using the radar systems; and transmit a detection message to the cloud service 205. One skilled in the art would recognize that the nodes may be programmed to scan for and detect vehicles in various combinations as described above, and transmit detection messages to the cloud service 205.

In the case that the detected vehicle responds with an identification message or transmits an interrogator message received by the node, the node may proceed to generate a first type of detection message. As discussed above with respect to FIGS. 3A and 3B, the identification message or interrogator message from an aircraft 131 may include a vehicle identifier and transponder aircraft data of the aircraft 131. The first type of detection message may include an identifier of the node, a cooperative vehicle indicator, the vehicle identifier, the transponder aircraft data, and/or confirmation data. The cooperative vehicle indicator may indicate that the vehicle is cooperative in responding to the interrogator systems. The confirmation data may include (1) speed, position, track, etc. of the detected vehicle as determined by the radar systems; and (2) vehicle configuration data. The vehicle configuration data may indicate the size, shape, etc. of the vehicle. Alternatively, the confirmation data may include an indicator that the confirmation data is the same or within a threshold difference from the transponder aircraft data.

In the case the detected vehicle does not respond with an identification message for a threshold wait period, the node may proceed to generate a second type of detection message. The second type of detection message may include the identifier of the node, an identifier of the vehicle, a non-cooperative vehicle indicator, and/or the confirmation data. The identifier of the vehicle may be a predefined identifier for non-cooperative vehicles. The non-cooperative vehicle indicator may indicate that the vehicle is not being cooperative in responding to the interrogator systems.

As discussed above, the node may transmit the detection messages to the cloud service 205 via the datalink system of the node. The cloud service 205 may receive the detection messages from the node. In response to receiving a detection message from a node, the cloud service 205 may then initiate a cross-vehicle analysis process by executing a cross-vehicle analysis program. To execute the cross-vehicle analysis of the cross-vehicle analysis program, the cloud service 205 may obtain vehicle state information based on the detection message; perform an analysis on the detection message and the vehicle state information; and transmit a status message to relevant vehicle(s). The cloud service 205 may continue to await receipt of another detection message from the node or another node to initiate the cross-vehicle analysis process again. The vehicle state information may include, for a list of all other vehicles as discussed below, (1) the planned flight path 340/unplanned flight path 342 received from other aircraft 131 and/or (2) speed, position, track of other aircraft 131 (including non-cooperative aircraft).

As discussed above, the cloud service 205 may receive aircraft positioning data from the aircraft 131 on a continuous/periodic basis. The cloud service 205 may store the received aircraft positioning data in a manner to track the aircraft 131 (hereinafter referred to as "collective vehicle state information"). The cloud service 205 may update the collective vehicle state information as individual aircraft 131 report their aircraft positioning data. The cloud service 205 may also receive previous detection messages of other vehicles (e.g., non-cooperative aircraft), and track their positions (or estimates thereof) in the collective vehicle state information.

The cloud service 205 may also receive all planned flight path 340/unplanned flight path 342 for the aircraft 131. The cloud service 205 may store the received planned flight path 340/unplanned flight path 342 in the collective vehicle state information.

To obtain vehicle state information based on the detection message, the cloud service 205 may extract the identifier of the node from the detection message; determine a location/position of the node based on the identifier of the node; and obtain the vehicle state information based on the location/position of the node. To determine the location/position of the node, the cloud service 205 may retrieve a location/position from, e.g., a database of identifiers of nodes associated with locations/positions of the nodes.

To obtain the vehicle state information based on the location/position of the node, the cloud service 205 may determine a list of all other vehicles based on the collective vehicle state information; and obtain the vehicle state information based the list of the all other vehicles. For instance, the cloud service 205 may determine the list by: determining the aircraft 131 that have a position within a threshold distance of the location/position of node; determining the aircraft 131 that have a position within an arbitrary three-dimensional volume of space around the location/position of the node; determining the aircraft 131 that have a position on a same route 141 of the node (if the node is associated with a route 141); determining the aircraft 131 that have a position within a same geographic region (e.g., city, metropolitan area, or portion thereof); and/or determining the aircraft 131 that are likely to intercept any one of the proceeding conditions within a time period (e.g., based on a speed of the detected object). To obtain the vehicle state information, the cloud service 205 may filter the collective vehicle state information to obtain (1) the planned flight path 340/unplanned flight path 342 received from other aircraft 131 and/or (2) speed, position, track of other aircraft 131 (including non-cooperative aircraft).

To perform the analysis on the detection message and the vehicle state information, the cloud service 205 may extract a vehicle identifier (or identification number (ID)) and vehicle information from the detection message; determine whether the vehicle ID is known; and perform one of two process (either a known vehicle process or an unknown vehicle process) based on whether the vehicle ID is known or not.

To extract the vehicle ID, the cloud service 205 may parse the detection message and retrieve the vehicle identifier of the first type of detection message or the identifier of the vehicle of the second type of detection message. To extract the vehicle information, the cloud service 205 may parse the detection message and retrieve (1) the transponder aircraft data and/or the confirmation data (if different than the transponder aircraft data) of the first type of detection message or (2) the confirmation data of the second type of detection message.

To determine whether the vehicle ID is known, the cloud service 205 may search, e.g., a known vehicle database with the vehicle ID and determine if any known vehicles have a matching ID. If the vehicle ID is known, the cloud service 205 may perform the known vehicle process; if the vehicle ID is not known, the cloud service 205 may perform the unknown vehicle process.

The unknown vehicle process may determine whether the detected (unknown) vehicle is a danger to any other vehicle (either based on current speed, position, etc. of planned/unplanned flight paths of the other vehicles). To perform the unknown vehicle process, the cloud service 205 may compare the vehicle information to the vehicle state information; determine whether the detected (unknown) vehicle is within a first threshold envelope of any vehicle of the vehicle state information and/or within the first threshold envelope of the planned flight path 340/unplanned flight path 342 for any vehicle of the vehicle state information; and generate a message based on a result of the determining.

The known vehicle process may determine whether the detected (known) vehicle is: (1) following a planned/unplanned flight path; and/or (2) in danger of any other vehicle. To perform the known vehicle process, the cloud service 205 may compare the vehicle information to the vehicle state information; determine whether the detected (known) vehicle is within a second threshold envelope of any vehicle of the vehicle state information and/or within the second threshold envelope of the planned flight path 340/unplanned flight path 342 for the detected (known) vehicle; and generate a message based on a result of the determining.

To compare the vehicle information to the vehicle state information, the cloud service 205 may (1) compare speed, position, etc. of the detected vehicle to speed, position, etc. of all of the vehicles; (2) compare speed, position, etc. of the detected vehicle to the speeds, positions (adjusted for time, travel, track, etc.) of the planned/unplanned flight paths of all the vehicles; and if a detected (known) vehicle (3) compare speed, position, etc. of the detected vehicle to the speed, position, etc. of the planned/unplanned flight paths for the detected vehicle. The cloud service 205 may filter the list of vehicles to those likely to be near the detected vehicle.

To determine whether the detected vehicle is within a threshold envelope of any vehicle of the vehicle state information, the cloud service 205 may determine the position of the detected vehicle is within a threshold distance of a position of a vehicle; determine the detected vehicle has a position within an arbitrary three-dimensional volume of space around the position of a vehicle; and/or determine the detected vehicle is likely to intercept any one of the proceeding conditions within a time period (e.g., based on a speed of the detected object).

To determine whether the detected vehicle is within a threshold envelope of any of the planned flight path 340/unplanned flight path 342, the cloud service 205 may determine the position of the detected vehicle is within a threshold distance of a position of a planned flight path 340/unplanned flight path 342 of a vehicle; determine the detected vehicle has a position within an arbitrary three-dimensional volume of space around the position of the planned flight path 340/unplanned flight path 342 of the vehicle; and/or determine the detected vehicle is likely to intercept any one of the proceeding conditions within a time period (e.g., based on a speed of the detected object).

The first threshold envelope and the second threshold envelope may be the same or different. The thresholds for position, arbitrary three-dimensional volumes, and likelihood of intercept may be the same or different for the first threshold envelope and the second threshold envelope. The thresholds for position, arbitrary three-dimensional volumes, and likelihood of intercept may be the same or different for known vehicles and for non-cooperative vehicles being tracked by the cloud service 205.

Generally, the cloud service 205 may determine: (1) the detected (known) vehicle is: (A) following its planned/unplanned flight path, (B) in danger of another known vehicle based on position or the flight path of the another known vehicle, and/or (C) in danger of another non-cooperative vehicle based on position of the another non-cooperative vehicle; and/or (2) the detected (unknown) vehicle is: (A) putting another known vehicle in danger based on position or the flight path of the another known vehicle.

For instance, the cloud service 205 may generate one or more messages based on the analysis result of the known vehicle process or the unknown vehicle process. The one or more messages may be: (1) a confirmation message if the detected (known) vehicle is within the second threshold envelope of the planned/unplanned flight path of detected (known) vehicle and/or not in danger of any other vehicle; (2) an alert message if the detected known vehicle is outside the second threshold envelope of the planned/unplanned flight path of detected (known) vehicle; (3) an alert message if the detected (known) vehicle is in danger of any other vehicle; (4) an intruder message if the detected (unknown) vehicle is within the first threshold envelope of any other vehicle (for instance such as a known vehicle that also has been detected); and (5) a possible intruder message if the detected (unknown) vehicle is not within the first threshold envelope of any other vehicle (depicted in FIG. 6).

The confirmation message may include a time stamp, an indicator, and/or the confirmation data. The time stamp may correspond to when the detected (known) vehicle was detected or when the detection message was transmitted by the node.

The alert message may include the time stamp, the indicator, the confirmation data, and/or instructions. The instructions may include corrective action so that the detected (known) vehicle can change course to remain within the second envelope of the planned/unplanned flight path, and/or actions to avoid a vehicle endangering the detected (known) vehicle.

The intruder message may include an intruder time stamp, the indicator, the confirmation data of the detected (unknown) vehicle, and/or intruder instructions. The possible intruder message may include the intruder time stamp, the indicator, the confirmation data of the detected (unknown) vehicle, and/or the intruder instructions. The intruder time stamp may be the same as the time stamp above, but for the detected (unknown) vehicle. The intruder instructions may include actions to avoid a vehicle endangering the receiving vehicle now or actions to avoid the vehicle if encountered.

The indicator may be a confirmation indicator, an alert indicator, an intruder indicator, and/or a possible intruder indicator. The confirmation indicator may indicate the detected (known) vehicle is following the planned/unplanned path within the second threshold envelope. The alert indicator may indicate one or both of: (1) detected (known) vehicle is outside second threshold envelope, and (2) other vehicle is endangering the detected (known vehicle). The intruder indicator may indicate that a detected (unknown) vehicle is endangering the vehicle now. The possible intruder indicator may indicate that a detected (unknown) vehicle may endanger the vehicle.

The cloud service 205 may transmit the one or more messages to the relevant vehicles. For instance, if the detected (unknown) vehicle causes an intruder message to be generated, the cloud service 205 may transmit the intruder message to the vehicles that the detected (unknown) vehicle may endanger; if the detected (unknown) vehicle causes a possible intruder message to be generated, the cloud service 205 may transmit the possible intruder message to the vehicles that are in a same region/route 141 as the detected (unknown) vehicle; if the detected (known) vehicle causes an confirmation message to be generated, the cloud service 205 may transmit the confirmation message to the detected (known) vehicle; if the detected (known) vehicle causes an alert message to be generated, the cloud service 205 may transmit the alert message to the detected (known) vehicle to inform the detected (known) vehicle that the detected (known) vehicle is outside the second threshold envelope of the planned/unplanned flight path.

In another aspect of the disclosure, the cloud service 205 may determine whether other information to be transmitted to the detected (known) vehicle or other relevant vehicles (e.g., the known vehicles in danger of a detected (unknown) vehicle). For instance, the other information may include (1) vertiport status; (2) vertiport landing-takeoff sequencing; (3) vehicle spacing information; and/or (4) updated weather information. For instance, the cloud service 205 may determine that the detected (known) vehicle is approaching a vertiport (e.g., as the node that transmitted the detection message is located at a vertiport or one or several leading to a vertiport), then the cloud service may determine to transmit the vertiport status and/or vertiport land-takeoff sequencing information; the cloud service 205 may determine that weather near the node (or between the node and a next node) has changed since last transmitting weather information to the detected (known) vehicle, then the cloud service 205 may determine to transmit the updated weather information. Moreover, the cloud service 205 may determine that the vehicles to be messaged based on a detected (unknown) vehicle may change destination to a closest vertiport, so the cloud service 205 may include vertiport status and/or landing-takeoff sequencing information for the closest vertiport and instructions to change destination to the closest vertiport, so as to avoid mid-air collisions with the detected (unknown) vehicle.

In another aspect of the disclosure, an aircraft 131 may suddenly lose track of position (e.g., because of poor GPS signal in a dense urban environment), and the on-board vehicle navigation systems 314 (or the vehicle management computer 302) may instruct the radar system (e.g., the digital phased array radar) to look forward to perform radar confirmation of vehicle position. For instance, the one or more IMUs of the on-board vehicle navigation systems 314 may track a current position of the aircraft 131. The aircraft 131 may cross reference the current position with one or more ground truth databases to determine relevant ground references (e.g., based on positions of ground references within a threshold distance of the current position of the aircraft 131). The aircraft 131 may control the radar system to confirm the presence and/or relative location of the relevant ground references (from the aircraft 131 to the relevant ground references). In response to confirming the presence and/or relative location of the relevant ground references, the aircraft 131 may determine a confirmed vehicle position. The confirmed vehicle position may be included in the navigation information so that the aircraft 131 may navigate.

This may be possible since UAM flights are of a relatively short distance, thus lower exposure time leads to lower IMU drift. As there may be lower IMU drift, the aircraft 131 may be able to stay within safety parameters of vehicle separation and spacing. Additionally or alternatively, position information may also be obtained from 5G cellular system as a backup.

Therefore, the methods and system of the present disclosure may ensure traffic spacing and intruder avoidance by using ground stations throughout the urban air environment. The methods and systems of the present disclosure may use the ground stations to detect vehicle positioning and intruder vehicles, to determine status of vehicles, to determine whether safety tolerances are satisfied, and/or to report for corrective or avoidance action.

Figure 4:
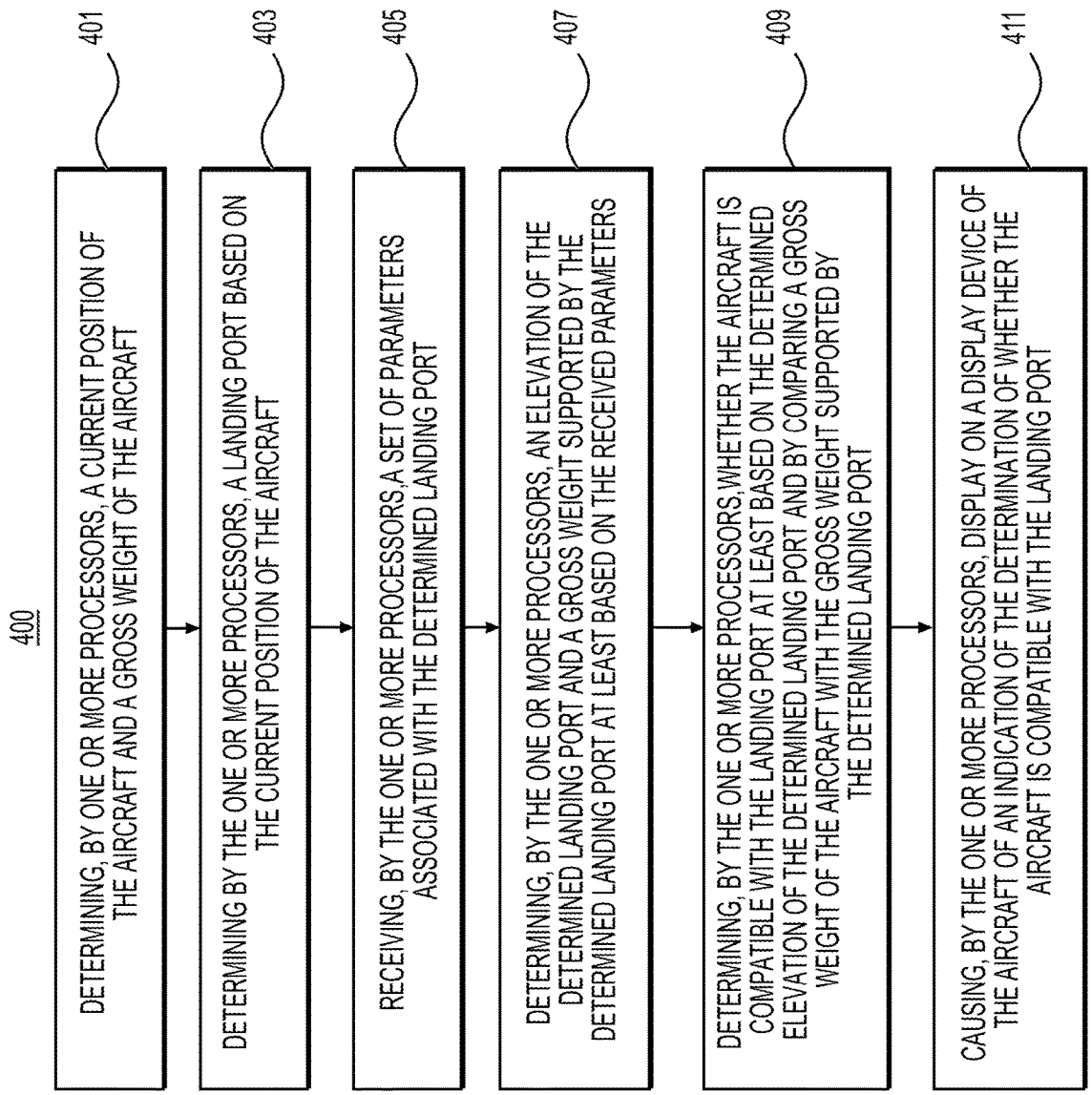
FIG. 4 depicts a flowchart for determining compatibility between an aircraft and a landing port, according to one or more embodiments.

FIG. 4 is a flowchart illustrating an exemplary method of determining compatibility between an aircraft and a landing port, for example, determining whether a closest landing port is able to support a gross weight of a vehicle. In some embodiments, the method 400 may be performed by one or more processors onboard the aircraft 131, cloud service 205 in communication with the aircraft 131, and/or one or more ground station(s) 215 in communication with the aircraft 131. Exemplary method 400 may include one or more of the following steps, in any order.

In step 401, the method may include determining, by one or more processors, a current position of the aircraft and a gross weight of the aircraft. The current position may include a current altitude of the aircraft as well as a current relative spatial position.

In step 403, the method may include determining, by the one or more processors, a landing port based on the current position of the aircraft. The landing port may be determined based on distance from the current position of the aircraft or may be any available landing port within a set of parameters from the aircraft.

In step 405, the method may include receiving, by the one or more processors, a set of parameters associated with the determined landing port. The parameters may include a height of the determined landing port and a distance to the determined landing port.

In step 407, the method may include determining, by the one or more processors, an elevation of the determined landing port and a gross weight supported by the determined landing port at least based on the received parameters.

In step 409, the method may include determining, by the one or more processors, whether the aircraft is compatible with the landing port at least based on the determined elevation of the determined landing port and by comparing a gross weight of the aircraft with the gross weight supported by the determined landing port. A determination may be made as to whether the landing port is elevated and whether the determined landing port can support the gross weight of the aircraft. A determination of compatibility between the aircraft and the landing port may be made if the landing port is determined to be elevated, and that the landing port may support the gross weight of the aircraft. If the gross weight of the aircraft is comfortably within a weight threshold that may be supported by the landing port, the aircraft and the landing port are compatible. If the gross weight of the aircraft is within the weight threshold that may be supported by the landing port, but within a cautionary band of weight (e.g., the gross weight of the aircraft is within a smaller delta of the threshold weight that may be supported by the landing port), the aircraft and the landing port may still be considered compatible, but a warning or an alert may be issued to the aircraft. If the gross weight of the aircraft is outside of the weight threshold that may be supported by the landing port, the aircraft and the landing port may not be considered compatible.

In step 411, the method may include causing, by the one or more processors, display on a display device of the aircraft of an indication of the determination of whether the aircraft is compatible with the landing port.

Figure 5:
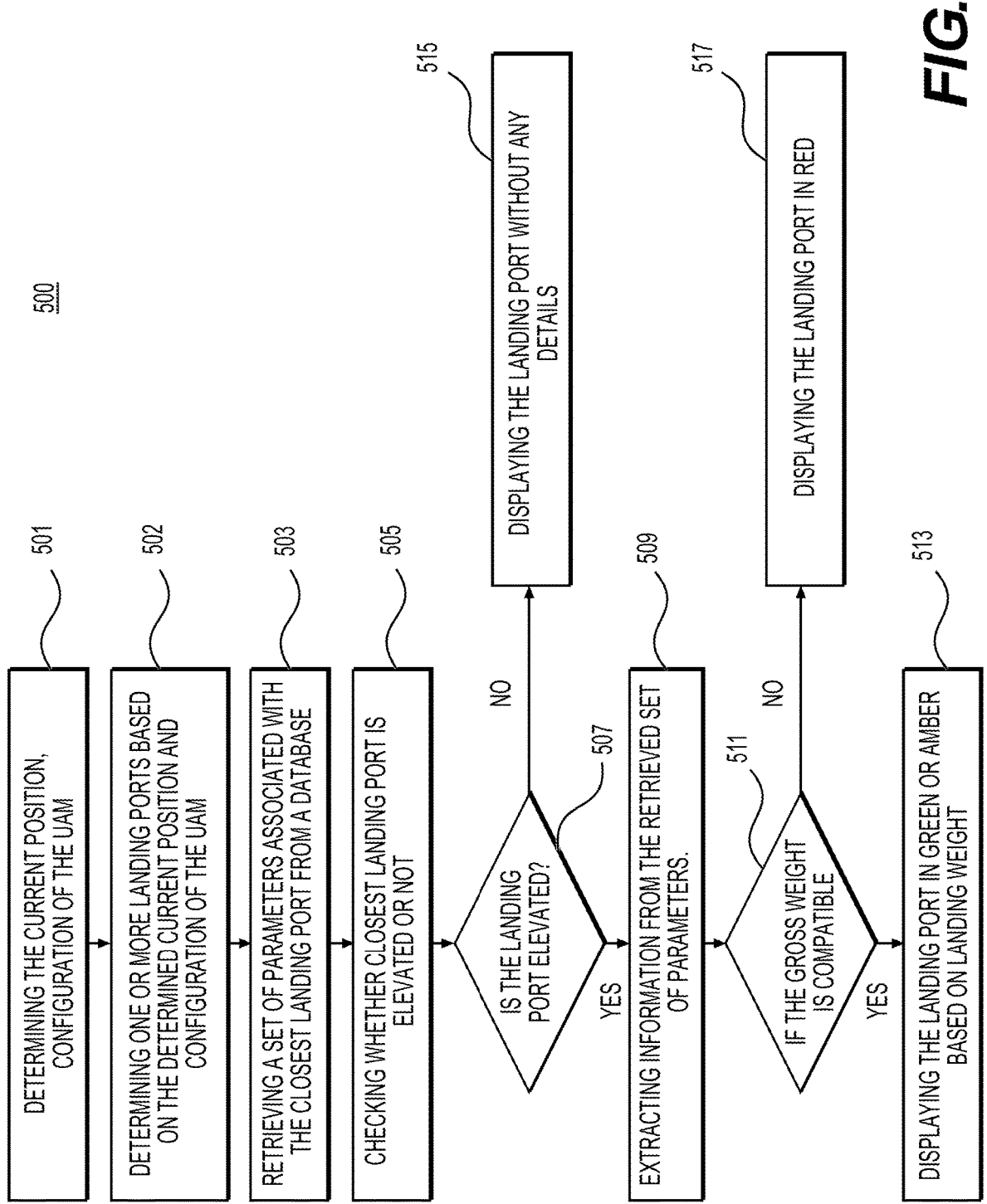
FIG. 5 depicts a flowchart for determining compatibility between an aircraft and a landing port, according to one or more embodiments.

FIG. 5 is a flowchart illustrating an exemplary method of determining and displaying an elevated landing port for a vehicle in an urban vicinity. In one embodiment, the method may be used for a UAM in an urban environment. In some embodiments, the method 400 may be performed by one or more processors onboard the aircraft 131, cloud service 205 in communication with the aircraft 131, and/or one or more ground station(s) 215 in communication with the aircraft 131. Exemplary method 500 may contain one or more of the following steps.

In step 501, the method may include determining a current position and configuration of the UAM. The configuration of the UAM comprises machine settings as needed for a particular environment. The configuration of the UAM may additionally include a type of UAM, a current flight plan of the UAM, etc.

In step 502, the method may including determining one or more landing ports based on the determined current position and configuration of the UAM.

In step 503, the method may include retrieving a set of parameters associated with the closest landing port from a database. The database may be located within at least one processor in the aircraft, in a cloud computing system, or on a ground station in communication with the aircraft. In one embodiment, the database may be located on all three.

In step 505, the method may include checking whether the closest landing port is elevated. An elevated landing port may be a landing port that is located some distance above a top of a building, and may include any elevated platform that is suitable for landing an aircraft upon. The elevation of the landing port may depend on the type of building it is located upon, and any relevant airspace regulations or rules for the location. For instance, certain types of buildings may not be able to support an elevated landing port, or a number of landing ports located on top of a building may determine whether the building may support an elevated landing port.

In step 507, the method may include determining whether the landing port is elevated. If the landing port is elevated, the method may continue to step 509. In step 509, the method may include extracting information from the retrieved set of parameters. The information may include an elevation of the closest landing port, a type of building associated with the closest landing port, and a gross weight supported by the closest landing port.

In some embodiments, the method may include step 515. In step 515, the method may include displaying the closest landing port within the UAM without including any details.

In step 511, the method may include determining whether the gross weight of the UAM is able to be supported by the closest landing port. If the gross weight of the UAM is compatible with the gross weight supported by the closest landing port, the method may include displaying the closest landing port in green or amber. As discussed above in reference to FIG. 4, a compatibility may be indicated between the gross weight of the aircraft and the threshold weight able to be supported by the landing port. If the gross weight of the aircraft is comfortably within the threshold weight able to be supported by the landing port, the display may be in a green color. If the gross weight of the aircraft is close to the maximum weight of the threshold weight able to be supported by the landing port within a certain delta, the display may be in an amber color. If the gross weight of the UAM is not compatible with the gross weight supported by the closest landing port, the method may include displaying the closest landing port in red to signify this lack of compatibility.

Figure 6:
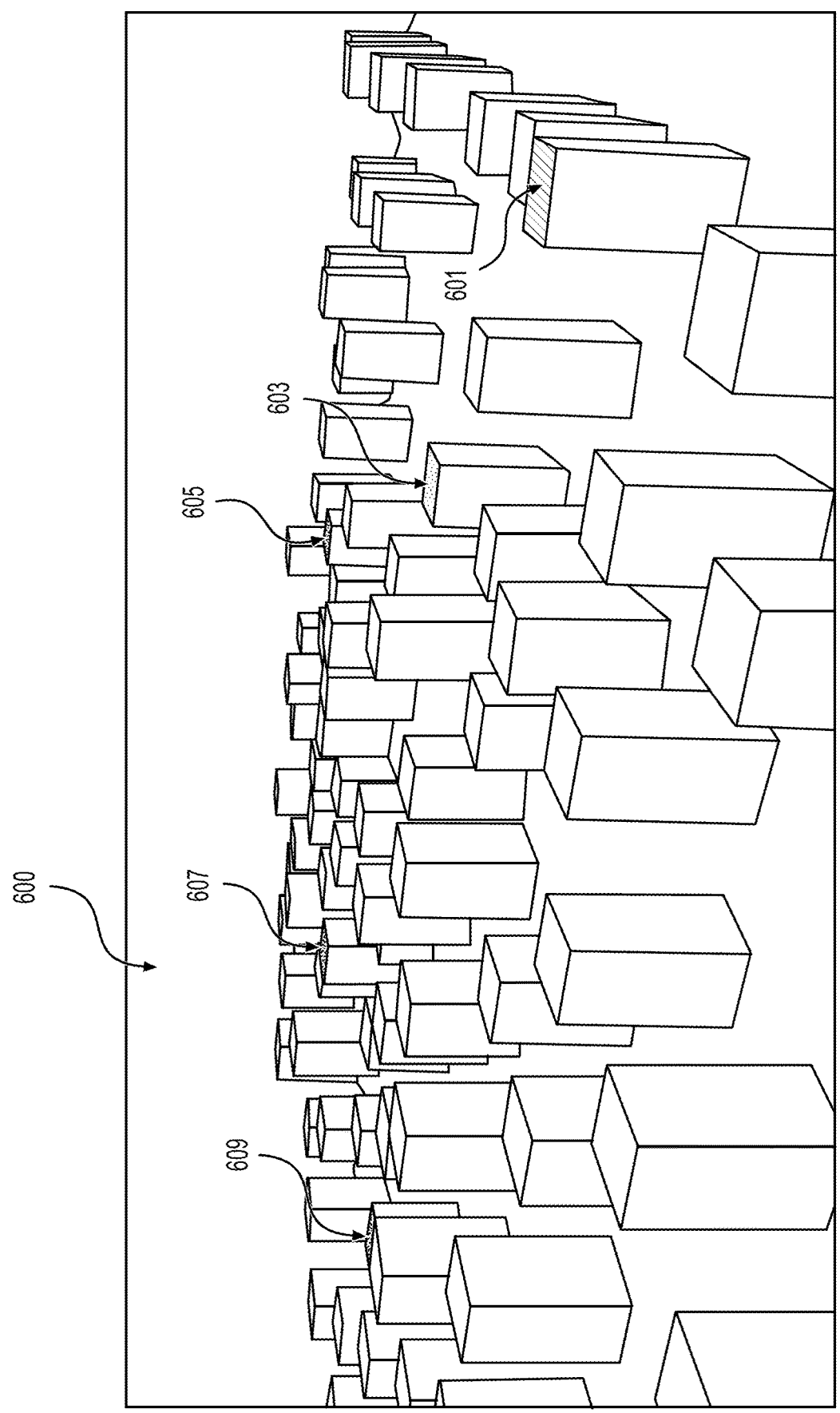
FIG. 6 is an exemplary display within the vehicle that may show a number of landing ports within a certain distance of a vehicle, according to an embodiment of the present disclosure.

FIG. 6 is an exemplary display within the vehicle that may show a number of landing ports within a certain distance of a vehicle, according to an embodiment of the present disclosure. In this exemplary view, landing ports 601-609 are shown to be compatible with the gross weight of the vehicle (such as landing port 601, displayed with a striped pattern), on the brink of compatibility with the gross weight of the vehicle (such as landing ports 605-609, displayed in a speckled pattern) or not compatible with the gross weight of the vehicle (such as landing port 603, displayed in a dotted pattern). This display may be used in conjunction with the systems and methods as disclosed herein.

Figure 7:
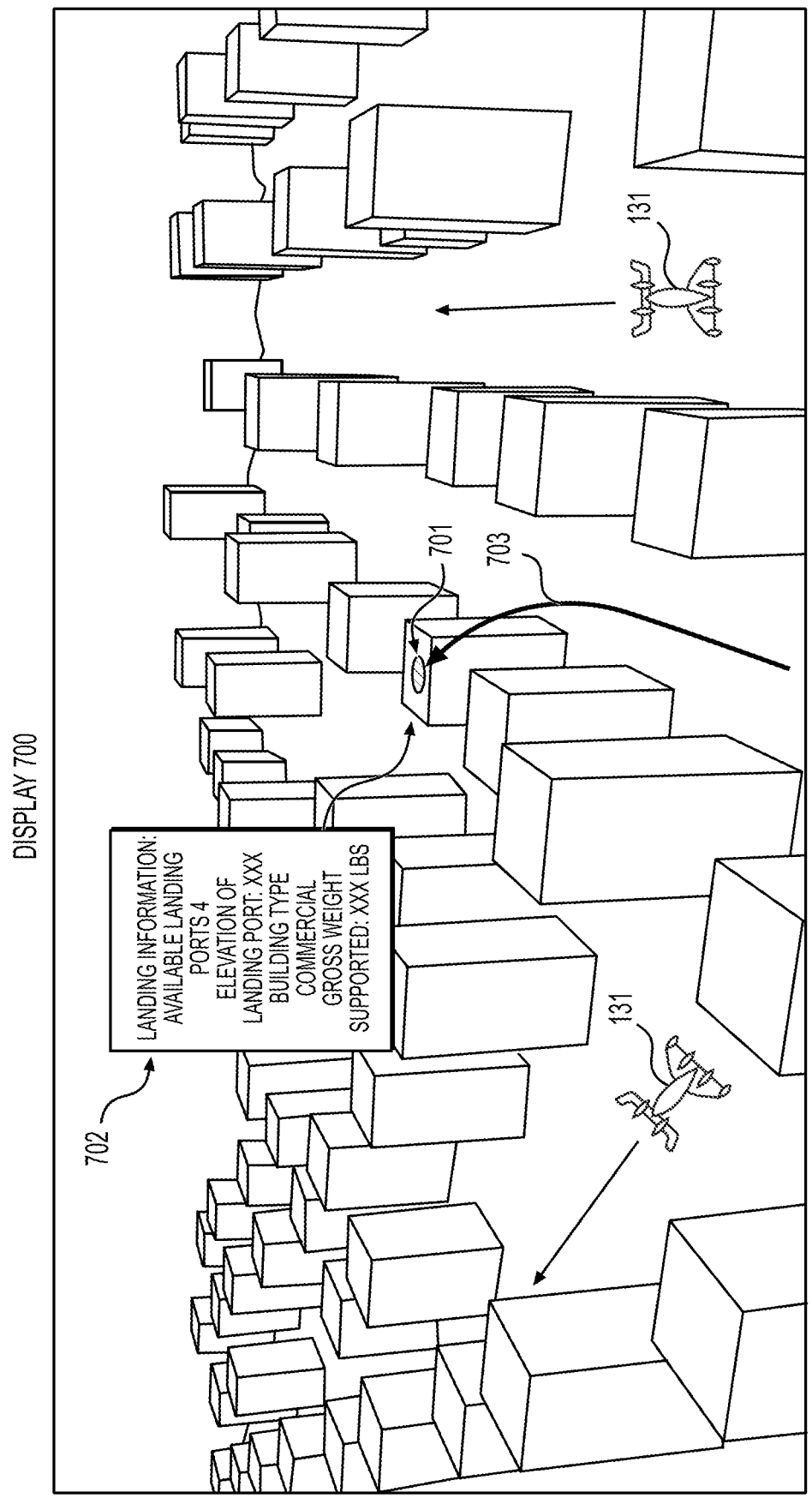
FIG. 7 is an exemplary display within the vehicle that may show details associated with a closest landing port, according to an embodiment of the present disclosure.

FIG. 7 is an additional exemplary display within the vehicle that may show details associated with a closest landing port, according to an embodiment of the present disclosure. The display 700 may show a set of details 702 associated with the closest landing port 701, including but not limited to a number of available landing ports if the building has more than one landing port, an elevation of the closest landing port, a building type, and/or a gross weight supported by the landing port. The display 700 may also show other aircraft, such as aircraft 131, and any associated routes and traffic patterns of the aircraft 131. The display may additionally show a route for the vehicle itself, as illustrated by arrow 703.

While FIG. 7 depicts details associated with one landing port, it is understood that details associated with one or more landing ports determined based on a current position and configuration of the UAM (e.g., step 502 of FIG. 5) may be displayed.

Figure 8:
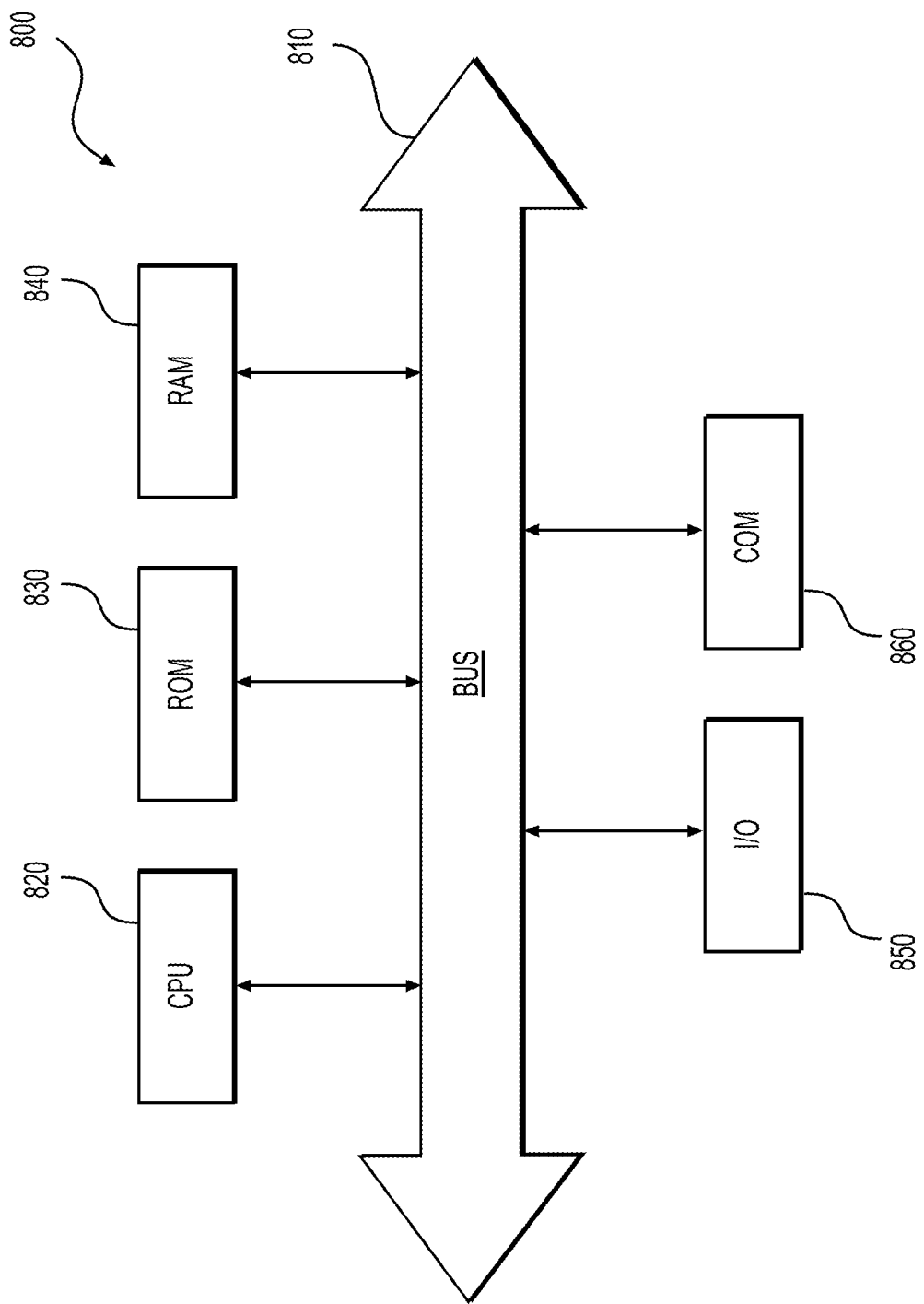
FIG. 8 depicts an example system that may execute techniques presented herein.

FIG. 8 depicts an example system that may execute techniques presented herein. FIG. 8 is a simplified functional block diagram of a computer that may be configured to execute techniques described herein, according to exemplary embodiments of the present disclosure. Specifically, the computer (or "platform" as it may not be a single physical computer infrastructure) may include a data communication interface 860 for packet data communication. The platform may also include a central processing unit ("CPU") 820, in the form of one or more processors, for executing program instructions. The platform may include an internal communication bus 810, and the platform may also include a program storage and/or a data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of determining compatibility between an aircraft and a landing port, the method comprising:
   determining, by one or more processors, a current position of the aircraft and a gross weight of the aircraft;
   determining, by the one or more processors, a landing port based on the current position of the aircraft, the landing port being located upon a top of a building;
   receiving, by the one or more processors, a set of parameters associated with the determined landing port;
   determining, by the one or more processors, that the determined landing port is elevated above the top of the building and a gross weight supported by the determined landing port at least based on the received parameters;
   determining, by the one or more processors, whether the aircraft is compatible with the landing port at least based on the determined elevation of the determined landing port above the top of the building and by comparing a gross weight of the aircraft with the gross weight supported by the determined landing port; and
   causing, by the one or more processors, display on a display device of the aircraft of an indication of the determination of whether the aircraft is compatible with the landing port.

2. The method of claim 1, wherein determining the landing port based on the current position of the aircraft includes determining a landing port that is closest in distance to the current position of the aircraft.

3. The method of claim 1, wherein receiving the set of parameters associated with the determined landing port includes retrieving the set of parameters from a database and/or receiving the set of parameters from one or more sensors on the aircraft.

4. The method of claim 1, further comprising:
   determining a type of building associated with the determined landing port at least based on the received parameters, wherein the type of building is a commercial, a hospital, or a residential type building; and
   determining a traffic pattern associated with the determined landing port at least based on the received parameters.

5. The method of claim 1, wherein causing display on the display device of the aircraft the indication of the determination of whether the aircraft is compatible with the landing port comprises:
   causing display of the determined elevation of the determined landing port; and
   causing display of an indication of whether the gross weight of the aircraft is compatible with the gross weight supported by the determined landing port.

6. The method of claim 5, wherein causing display on the display device of the aircraft the indication of the determination of whether the aircraft is compatible with the landing port further comprises:
   determining and displaying a color associated with the determined landing port based on whether the gross weight of the aircraft is compatible with the gross weight supported by the determined landing port.

7. The method of claim 6, wherein displaying a landing port in green indicates that the landing port is compatible with the gross weight of the vehicle,
   wherein displaying a landing port in red indicates that the landing port is not compatible with the gross weight of the vehicle, and
   wherein displaying a landing port in amber indicates that the landing port is compatible with the gross weight of the vehicle but closer to a threshold weight the landing port supports.

8. A system of displaying compatibility between an aircraft and a landing port, the system comprising:
   a display device including one or more screens;
   a memory storing instructions; and
   a processor executing the instructions to perform a process for providing a display to an operator of an aircraft comprising:
      determining, by one or more processors, a current position of the aircraft, a gross weight of the aircraft;
      determining, by the one or more processors, a landing port based on the current position of the aircraft, the landing port being located upon a top of a building;
      receiving, by the one or more processors, a set of parameters associated with the determined landing port;
      determining, by the one or more processors, that the determined landing port is elevated above the top of the building and a gross weight supported by the determined landing port at least based on the received parameters;
      determining, by the one or more processors, whether the aircraft is compatible with the landing port at least based on the determined elevation of the determined landing port above the top of the building and by comparing a gross weight of the aircraft with the gross weight supported by the determined landing port; and causing, by the one or more processors, display on a display device of the aircraft of an indication of the determination of whether the aircraft is compatible with the landing port.

9. The system of claim 8, wherein receiving the set of parameters associated with the determined landing port includes retrieving the set of parameters from a database and/or receiving the set of parameters from one or more sensors on the aircraft.

10. The system of claim 8, further comprising: determining a type of building associated with the determined landing port at least based on the received parameters, wherein the type of building is a commercial, a hospital, or a residential type building; and determining a traffic pattern associated with the determined landing port at least based on the received parameters.

11. The system of claim 8, wherein causing display on the display device of the aircraft the indication of the determination of whether the aircraft is compatible with the landing port comprises:

causing display of the determined elevation of the determined landing port; and causing display of an indication of whether the gross weight of the aircraft is compatible with the gross weight supported by the determined landing port.

12. The system of claim 11, wherein causing display on the display device of the aircraft the indication of the determination of whether the aircraft is compatible with the landing port further comprises:

determining and displaying a color associated with the determined landing port based on whether the gross weight of the aircraft is compatible with the gross weight supported by the determined landing port.

13. The system of claim 12, wherein displaying a landing port in green indicates that the landing port is compatible with the gross weight of the vehicle, wherein displaying a landing port in red indicates that the landing port is not compatible with the gross weight of the vehicle, and wherein displaying a landing port in amber indicates that the landing port is compatible with the gross weight of the vehicle.

14. A non-transitory computer-readable medium storing instructions that, when executed by a processor, cause the processor to perform a method of determining compatibility between an aircraft and a landing port, the method comprising:

determining, by one or more processors, a current position of the aircraft and a gross weight of the aircraft;

determining, by the one or more processors, a landing port based on the current position of the aircraft, the landing port being located upon a top of a building;

receiving, by the one or more processors, a set of parameters associated with the determined landing port;

determining, by the one or more processors, that the determined landing port is elevated above the top of the building and a gross weight supported by the determined landing port at least based on the received parameters;

determining, by the one or more processors, whether the aircraft is compatible with the landing port at least based on the determined elevation of the determined landing port above the top of the building and by comparing a gross weight of the aircraft with the gross weight supported by the determined landing port; and causing, by the one or more processors, display on a display device of the aircraft of an indication of the determination of whether the aircraft is compatible with the landing port.

15. The non-transitory computer-readable medium of claim 14, wherein determining the landing port based on the current position of the aircraft includes determining a landing port that is closest in distance to the current position of the aircraft.

16. The non-transitory computer-readable medium of claim 14, wherein receiving the set of parameters associated with the determined landing port includes retrieving the set of parameters from a database and/or receiving the set of parameters from one or more sensors on the aircraft.

17. The non-transitory computer-readable medium of claim 14, further comprising:

determining a type of building associated with the determined landing port at least based on the received parameters, wherein the type of building is a commercial, a hospital, or a residential type building; and determining a traffic pattern associated with the determined landing port at least based on the received parameters.

18. The non-transitory computer-readable medium of claim 14, wherein causing display on the display device of the aircraft the indication of the determination of whether the aircraft is compatible with the landing port comprises:

causing display of the determined elevation of the determined landing port; and causing display of an indication of whether the gross weight of the aircraft is compatible with the gross weight supported by the determined landing port.

19. The non-transitory computer-readable medium of claim 18, wherein causing display on the display device of the aircraft the indication of the determination of whether the aircraft is compatible with the landing port further comprises:

determining and displaying a color associated with the determined landing port based on whether the gross weight of the aircraft is compatible with the gross weight supported by the determined landing port.

20. The non-transitory computer-readable medium of claim 19, wherein displaying a landing port in green indicates that the landing port is compatible with the gross weight of the vehicle;

wherein displaying a landing port in red indicates that the landing port is not compatible with the gross weight of the vehicle; and wherein displaying a landing port in amber indicates that the landing port is compatible with the gross weight of the vehicle.

* * * * *